US012398898B2

(12) United States Patent
Tanaka et al.

(10) Patent No.: US 12,398,898 B2
(45) Date of Patent: Aug. 26, 2025

(54) BLOWER, OZONE-DEGRADABLE COATING FILM-BEARING ARTICLE, AIR-CONDITIONING SYSTEM, OZONE DEGRADATION METHOD, AND METHOD OF FORMING OZONE-DEGRADABLE FILM

(71) Applicant: TOYOTA JIDOSHA KABUSHIKI KAISHA, Toyota (JP)

(72) Inventors: Toru Tanaka, Toyota (JP); Takayoshi Takahira, Togo-chou (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1098 days.

(21) Appl. No.: 17/358,590

(22) Filed: Jun. 25, 2021

(65) Prior Publication Data

US 2021/0404678 A1    Dec. 30, 2021

(30) Foreign Application Priority Data

Jun. 29, 2020   (JP) ................................ 2020-112176
Sep. 22, 2020   (JP) ................................ 2020-158046

(51) Int. Cl.
    *A62B 7/08*      (2006.01)
    *B01D 46/00*      (2022.01)
    (Continued)

(52) U.S. Cl.
    CPC ............ *F24F 8/98* (2021.01); *B01D 46/0036* (2013.01); *F24F 7/06* (2013.01); *F24F 8/20* (2021.01);
(Continued)

(58) Field of Classification Search
    CPC .......... B01D 53/02; F01P 11/12; A61L 9/014; A61L 2209/22
(Continued)

(56) References Cited

U.S. PATENT DOCUMENTS 6,818,254 B1 * 11/2004   Hoke ..................... B01D 53/02
                                                                502/506
2001/0021363 A1    9/2001   Poles et al.
(Continued)

FOREIGN PATENT DOCUMENTS

CN       101219232 B     7/2010
CN       104841292 B     2/2017
(Continued)

OTHER PUBLICATIONS

Catalog of JONCRYL 690, BASF, 2007.01.01, URL:http://www.xtgchem.cn/upload/20110629023118.pdf.

*Primary Examiner* — Monzer R Chorbaji
(74) *Attorney, Agent, or Firm* — Oblon, McClelland, Maier & Neustadt, L.L.P.

(57) ABSTRACT

A blower including a blowing unit that suctions and blows air, and at least one of a first venting member that has a first venting hole through which air blown from the blowing unit passes and that includes a coating film including a manganese oxide-based catalyst, activated carbon, a polyacrylate-based dispersant, and a resin, provided on a wall surface of the first venting hole, or a second venting member that has a second venting hole through which air suctioned into the blowing unit passes and that includes such a coating film provided on a wall surface of the second venting hole.

7 Claims, 6 Drawing Sheets

(51) Int. Cl.
　　　*F24F 7/06*　　　(2006.01)
　　　*F24F 8/20*　　　(2021.01)
　　　*F24F 8/98*　　　(2021.01)

(52) U.S. Cl.
　　　CPC ............... *B01D 2239/0478* (2013.01); *B01D 2255/2073* (2013.01); *B01D 2279/50* (2013.01)

(58) Field of Classification Search
　　　USPC ........................................................ 422/122
　　　See application file for complete search history.

(56) References Cited

U.S. PATENT DOCUMENTS

| | | |
|---|---|---|
| 2001/0031693 A1 | 10/2001 | Hoke et al. |
| 2002/0018742 A1 | 2/2002 | Hoke et al. |
| 2002/0074174 A1 | 6/2002 | Dettling et al. |
| 2003/0166466 A1 | 9/2003 | Hoke et al. |
| 2005/0100492 A1 | 5/2005 | Hoke et al. |
| 2011/0281971 A1 | 11/2011 | Hwang et al. |
| 2014/0030153 A1 | 1/2014 | Sugimoto et al. |
| 2015/0038036 A1 | 2/2015 | Yamanaka et al. |
| 2018/0169287 A1 | 6/2018 | Nettesheim et al. |
| 2020/0299526 A1 | 9/2020 | Takahira et al. |
| 2021/0178313 A1 | 6/2021 | Hidaka et al. |

FOREIGN PATENT DOCUMENTS

| | | |
|---|---|---|
| DE | 10 2010 021 555 A1 | 11/2011 |
| JP | 2-273764 A | 11/1990 |
| JP | 4-89873 A | 3/1992 |
| JP | 9-77991 A | 3/1997 |
| JP | 2000-126592 A | 5/2000 |
| JP | 2002-51 4966 | 5/2002 |
| JP | 2003-202700 A | 7/2003 |
| JP | 2008-000746 | 1/2008 |
| JP | 2012-514678 A | 6/2012 |
| JP | 2014-024027 | 2/2014 |
| JP | 2017-074309 A | 4/2017 |
| JP | 2018-531173 A | 10/2018 |
| JP | 6945938 B2 | 10/2021 |
| WO | WO 2013/147294 A1 | 10/2013 |
| WO | WO 2016/117518 A1 | 7/2016 |
| WO | WO 2018/025417 A1 | 2/2018 |
| WO | WO 2019/093173 A1 | 5/2019 |

* cited by examiner

[FIG. 1]
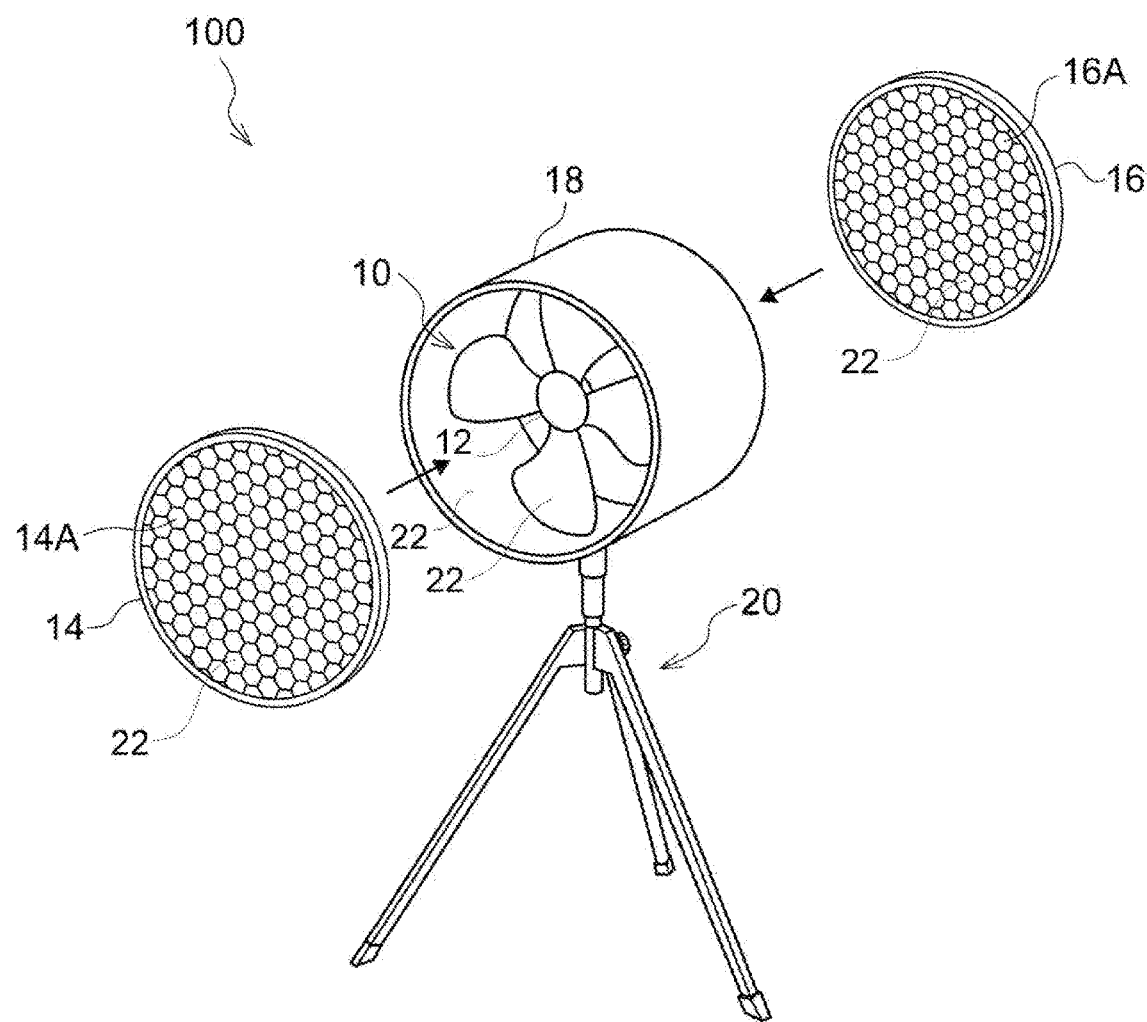

[FIG. 2]
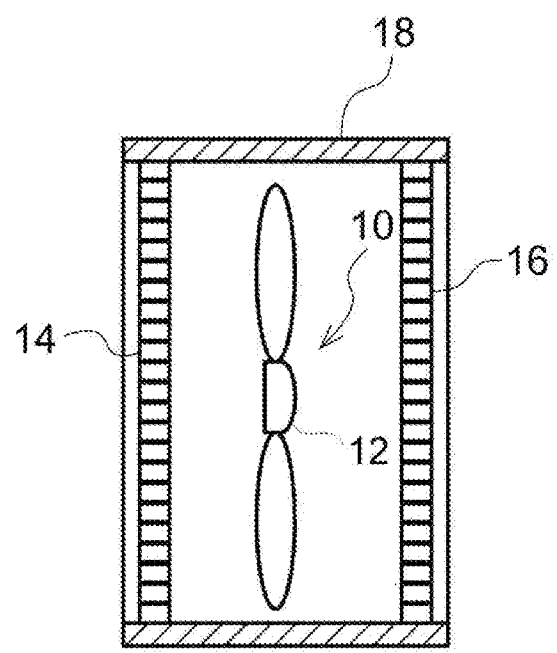

[FIG. 3]
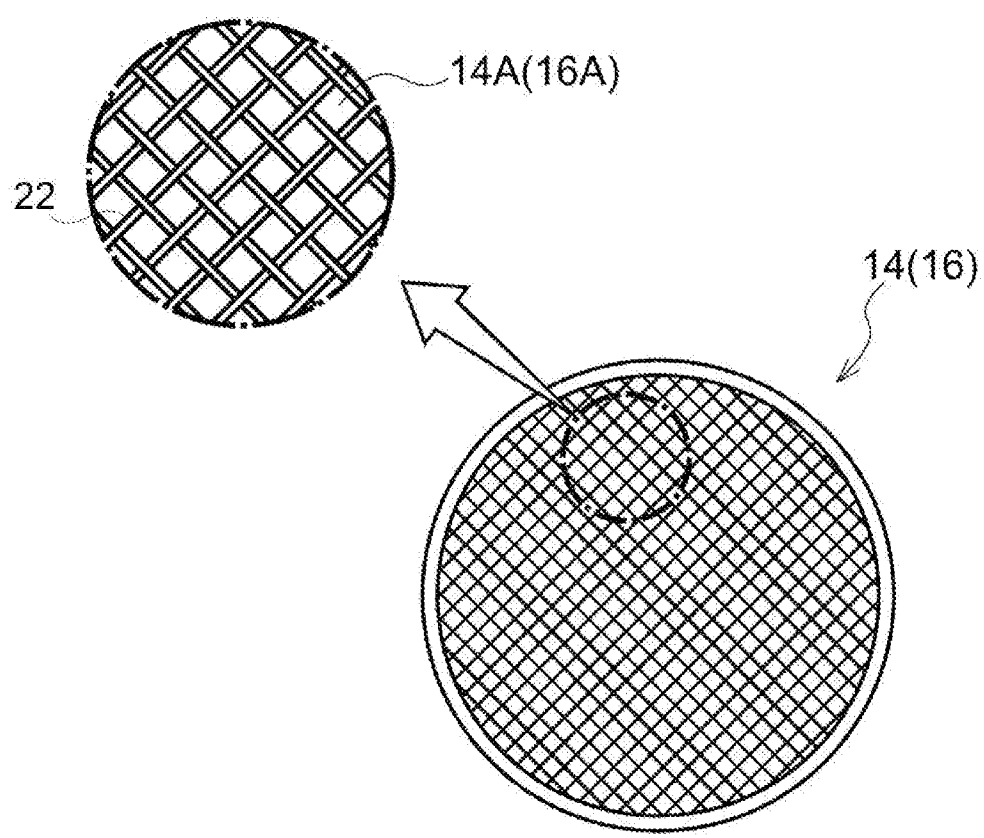

[FIG. 4]
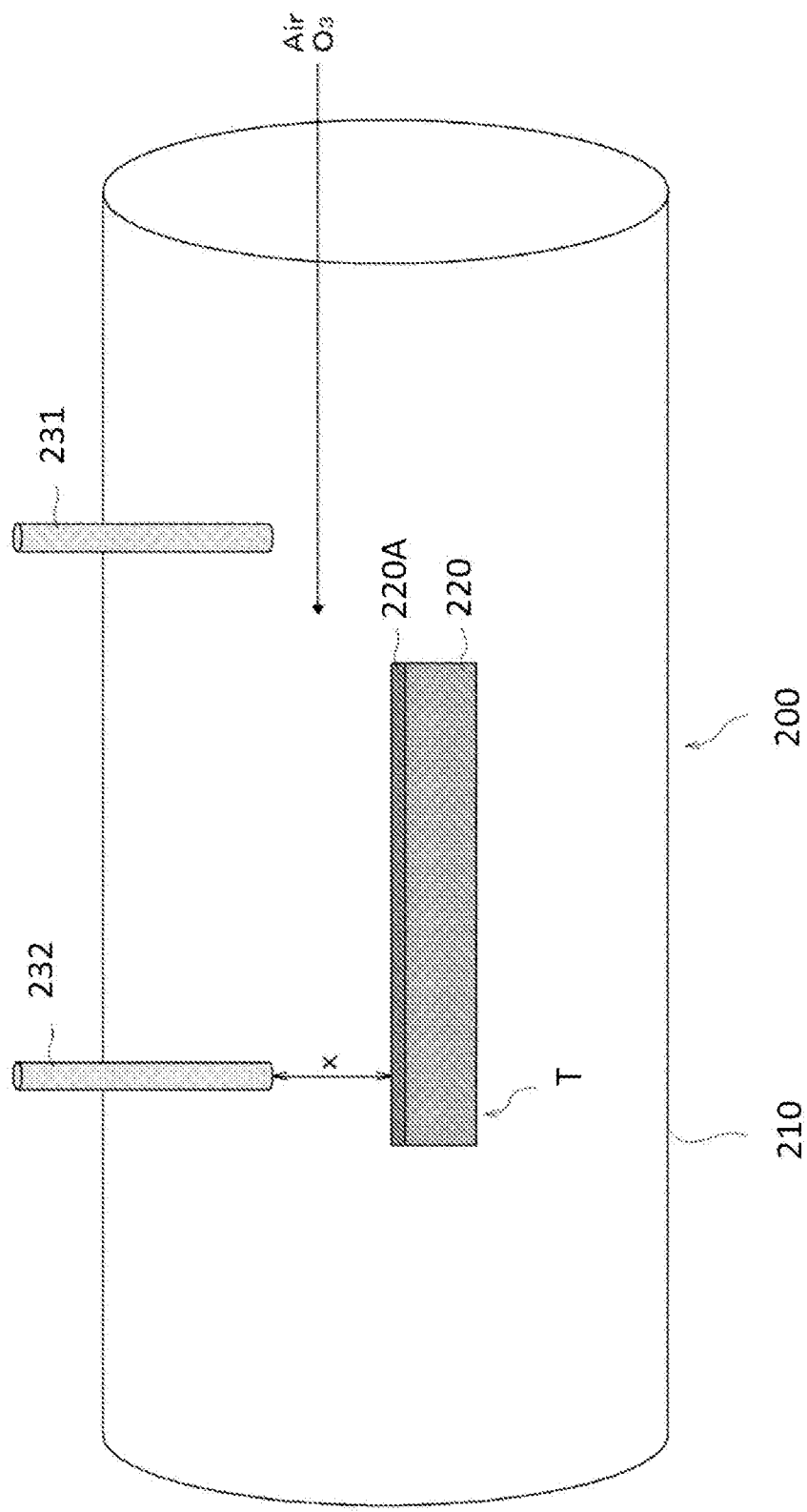

[FIG. 5]
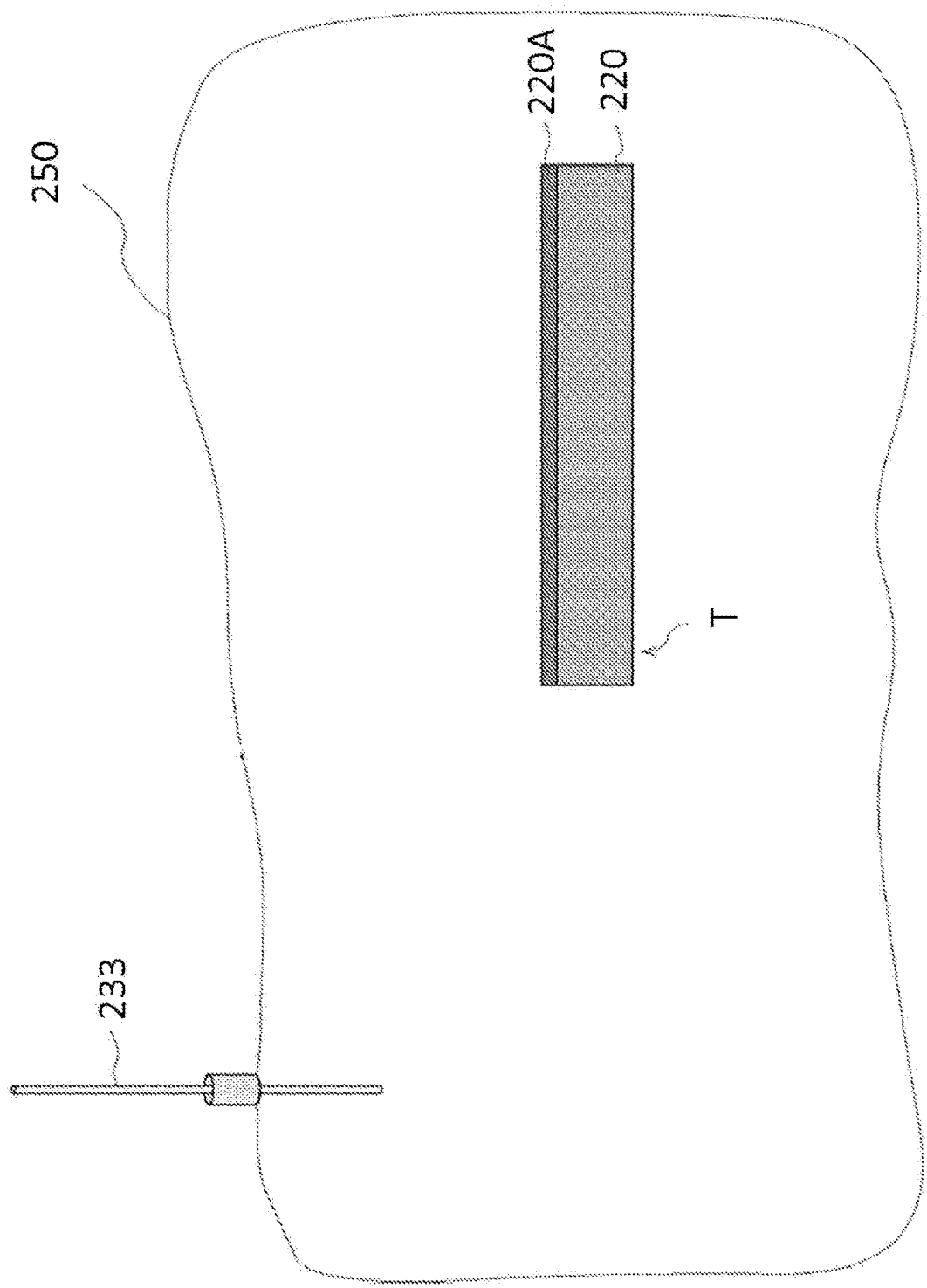

[FIG. 6]
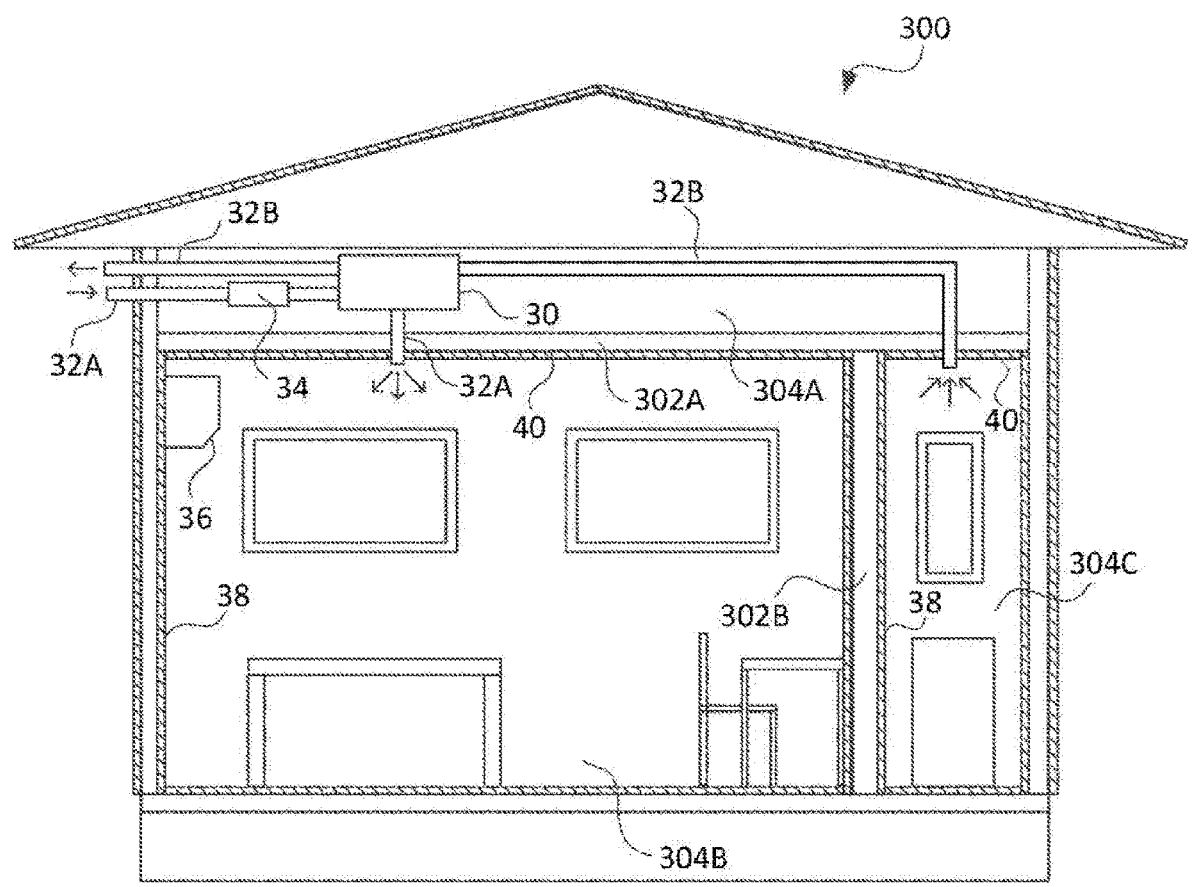

BLOWER, OZONE-DEGRADABLE COATING FILM-BEARING ARTICLE, AIR-CONDITIONING SYSTEM, OZONE DEGRADATION METHOD, AND METHOD OF FORMING OZONE-DEGRADABLE FILM

CROSS-REFERENCE TO RELATED APPLICATION

This application is based on and claims priority under 35 USC 119 from Japanese Patent Application No. 2020-112176 filed on Jun. 29, 2020, and Japanese Patent Application No. 2020-158046 filed on Sep. 22, 2020, the disclosure of which is incorporated by reference herein.

BACKGROUND

Technical Field

The present disclosure relates to a blower, an ozone-degradable coating film-bearing article, an air-conditioning system, an ozone degradation method, and a method of forming an ozone-degradable film.

Related Art

Exhaust gases emitted from plants, automobiles, and the like include nitrogen oxides ($NO_x$) and volatile organic compounds (VOC) such as hydrocarbons (HC). Volatile organic compounds (VOC) are converted into photochemical oxidants ($O_x$) through chemical reaction with oxygen in the atmosphere and photochemical change with ultraviolet light of sunlight. Such photochemical oxidants are atmospheric contaminants mainly containing ozone ($O_3$), namely, substances of concern, and cause photochemical smog.

The environmental standards of photochemical oxidants are prescribed to be 0.06 ppm or less per hour in Japan. However, photochemical oxidants above the standard values are currently observed continuously, and there is a demand for an immediate decrease response to photochemical oxidants due to the raising of worldwide awareness about recent global environmental conservation issues.

While emission of nitrogen oxides, volatile organic compounds, and the like is controlled, a technique is proposed in which generation of photochemical smog is inhibited by degradation (namely, removal) of ozone generated.

For example, there has been studied an atmosphere purification system for an improvement of the atmosphere by mounting a radiator including an ozone-degrading catalyst supported thereon onto a vehicle and travelling the vehicle and there has been practically used an automobile using a direct ozone reduction technique (DOR; Direct Ozone Reduction), for example, an automobile provided with an atmosphere purification apparatus for vehicles, which can degrade ozone in the atmosphere by an ozone degradation catalyst (namely, ozone removal catalyst), in some regions, for example, California in the U.S. In particular, vehicles into which such a direct ozone reduction technique (DOR) is introduced and manufacturers selling such vehicles can receive predetermined privileges (for example, NMOG credit certification), as these are regarded to decrease the amount of emission of non-methane organic gases (NMOG) corresponding to substances causing photochemical smog, for example, in California in the U.S.

For example, Literature 1 and 2 each have disclosed, as a technique about a radiator including an ozone degradation catalyst supported thereon, a technique of an atmosphere purification apparatus for vehicles, in which a metal oxide catalyst is supported on the surface of a radiator (fin or the like) into which the atmosphere flows during traveling of a vehicle, and have described degradation of ozone contained in the atmosphere with an ozone degradation catalyst layer on the radiator surface.

Literature 3 has proposed an atmosphere purification apparatus for vehicles, in which not only a metal oxide catalyst, but also activated carbon having a function of removing ozone is used.

Literature 1: Japanese National-Phase Publication (JP-A) No. 2002-514966
Literature 2: Japanese Patent Application Laid-Open (JP-A) No. 2008-000746
Literature 3: Japanese Patent Application Laid-Open (JP-A) No. 2014-024027

SUMMARY

There have been thus conventionally developed techniques of an atmosphere purification apparatus for vehicles, in which a catalyst for degrading ozone in the atmosphere is supported on the surface of a radiator (fin or the like), thereby allowing ozone in the atmosphere to be removed by an ozone degradation catalyst layer provided on the radiator surface, as shown in JP-A No. 2002-514966, JP-A No. 2008-000746, and JP-A No. 2014-024027.

Blowers such as electric fans, circulators, air conditioners, and air cleaners, when having a function of being capable of degrading ozone in the atmosphere and blowing air decreased in concentration of ozone, can considerably contribute to removal of ozone in the atmosphere in, for example, indoor and outdoor facilities.

For example, there are many crops high in sensitivity to ozone, among agricultural crops and horticultural crops, and ozone causes various damages to such crops, thereby leading to decreases in growth and yield. Thus, a blower having a function of degrading ozone in the atmosphere can alleviate any damage to agricultural crops and horticultural crops due to ozone in, for example, indoor and outdoor facilities.

For example, any influence of ozone on the human body has been reported, and, for example, a blower having a function of degrading ozone in the atmosphere can also alleviate any influence of ozone on the human body in, for example, indoor and outdoor facilities.

In a case in which an article having a function of degrading ozone in the atmosphere, without any limitation on such blowers, can degrade ozone, not only an environment decreased in concentration of ozone can be realized, but also any damage to agricultural crops and horticultural crops due to ozone and any influence of ozone on the human body can be alleviated.

An object of one aspect of the disclosure is to provide a blower which can blow air decreased in concentration of ozone.

An object of another aspect of the disclosure is to provide an ozone-degradable coating film-bearing article, an air-conditioning system, an ozone degradation method, and a method of forming an ozone-degradable film, which can each allow an environment decreased in concentration of ozone to be realized.

A first aspect of the disclosure relates to a blower including
 a blowing unit that suctions and blows air, and
 an ozone-degradable coating film that is provided at at least one of a location for contact with air blown from the blowing unit or a location for contact with air suctioned into the blowing unit, and that includes a manganese oxide-based catalyst, activated carbon, a polyacrylate-based dispersant, and a resin.

According to the first aspect of the disclosure, the ozone-degradable coating film including the above components has high ozone degradation performance, and therefore ozone contained in the air is degraded in a case in which air blown from the blowing unit is brought into contact with the ozone-degradable coating film. Ozone contained in the air is degraded also in a case in which air suctioned into the blowing unit is brought into contact with the ozone-degradable coating film. Thus, air decreased in concentration of ozone can be blown.

A second aspect of the disclosure relates to the blower according to the first aspect, including
at least one of a first venting member, that has a first venting hole through which air blown from the blowing unit passes and that includes the ozone-degradable coating film provided on a wall surface of the first venting hole, or a second venting member, that has a second venting hole through which air suctioned into the blowing unit passes and that includes the ozone-degradable coating film provided on a wall surface of the second venting hole.

According to the second aspect of the disclosure, the ozone-degradable coating film including the above components has high ozone degradation performance, and therefore ozone contained in the air is degraded in a case in which air blown from the blowing unit passes through the venting hole of the first venting member and is brought into contact with the ozone-degradable coating film. Ozone contained in the air is degraded also in a case in which air suctioned into the blowing unit passes through the second venting hole of the second venting member and is brought into contact with the ozone-degradable coating film. Thus, air decreased in concentration of ozone can be blown.

A third aspect of the disclosure relates to the blower according to the second aspect, wherein the first venting member is a honeycomb structural member having a through-hole as the first venting hole.

According to the third aspect of the disclosure, the first venting member here adopted is a honeycomb structural member large in area of a wall surface of the through-hole through which air passes, whereby not only the contact area of air with the ozone-degradable coating film can be increased, but also air decreased in concentration of ozone can be blown.

A fourth aspect of the disclosure relates to the blower according to the second aspect or the third aspect, wherein the second venting member is a honeycomb structural body having a through-hole as the second venting hole.

According to the fourth aspect of the disclosure, the second venting member here adopted is a honeycomb structural member large in area of a wall surface of the through-hole through which air passes, whereby not only the contact area of air with the ozone-degradable coating film can be increased, but also air decreased in concentration of ozone can be blown.

A fifth aspect of the disclosure relates to the blower according to any one of the second aspect to the fourth aspect, wherein the first venting member is a filter member having a mesh hole as the first venting hole.

According to the fifth aspect of the disclosure, the first venting member here adopted is a filter member large in area of a wall surface of the mesh hole through which air passes, whereby not only the contact area of air with the ozone-degradable coating film can be increased, but also air decreased in concentration of ozone can be blown.

A sixth aspect of the disclosure relates to the blower according to any one of the second aspect to the fifth aspect, wherein the second venting member is a filter member having a mesh hole as the second venting hole.

According to the sixth aspect of the disclosure, the second venting member here adopted is a filter member large in area of a wall surface of the mesh hole through which air passes, whereby not only the contact area of air with the ozone-degradable coating film can be increased, but also air decreased in concentration of ozone can be blown.

A seventh aspect of the disclosure relates to the blower according to any one of the second aspect to the sixth aspect, wherein the blowing unit has a rotary vane, and the ozone-degradable coating film provided on a vane surface of the rotary vane.

According to the seventh aspect of the disclosure, in a case in which the rotary vane is rotated, thereby suctioning and blowing air, such air is brought into contact with the ozone-degradable coating film and thus air decreased in concentration of ozone can be blown.

An eighth aspect of the disclosure relates to the blower according to any one of the second aspect to the seventh aspect, including a guiding member that guides air blown from the blowing unit, toward the first venting member.

According to the eighth aspect of the disclosure, the guiding member allows for an increase in amount of air passing through the first venting hole of the first venting member and furthermore enables air decreased in concentration of ozone to be blown.

A ninth aspect of the disclosure relates to the blower according to any one of the first aspect to the eighth aspect, wherein the manganese oxide-based catalyst is a manganese dioxide-based catalyst.

According to the ninth aspect of the disclosure, the manganese dioxide-based catalyst is high in catalytic activity performance, and allows for an enhancement in ozone degradation ability of the ozone-degradable coating film and furthermore enables air decreased in concentration of ozone to be blown.

A tenth aspect of the disclosure relates to the blower according to any one of the first aspect to the ninth aspect, wherein a compounding ratio of the activated carbon to the manganese oxide-based catalyst satisfies 20/80≤activated carbon/manganese oxide-based catalyst≤80/20 in terms of a mass ratio.

According to the tenth aspect of the disclosure, the synergistic effect of ozone degradability due to a combination of the manganese oxide-based catalyst and the activated carbon allows for an enhancement in ozone degradation ability of the ozone-degradable coating film and furthermore enables air decreased in concentration of ozone to be blown.

An eleventh aspect of the disclosure relates to the blower according to any one of the first aspect to the tenth aspect, wherein a total amount of the manganese oxide-based catalyst and the activated carbon with respect to the ozone-degradable coating film is from 60% by mass to 90% by mass.

According to the eleventh aspect of the disclosure, high ozone degradation performance is imparted to the ozone-degradable coating film and air decreased in concentration of ozone can be continuously blown, without any loss of attachment ability of the ozone-degradable coating film.

A twelfth aspect of the disclosure relates to the blower according to any one of the first aspect to the eleventh aspect, wherein the polyacrylate-based dispersant is a dispersant having a weight average molecular weight in a range of from 5000 to 30000, an acid value in a range of from 1 to 50, and a hydrogen-ion exponent in a range of from pH 4 to pH 9.

According to the twelfth aspect of the disclosure, high ozone degradation performance is imparted to the ozone-degradable coating film and air decreased in concentration of ozone can be continuously blown, without any loss of attachment ability of the ozone-degradable coating film.

A thirteenth aspect of the disclosure relates to the blower according to any one of the first aspect to the twelfth aspect, wherein a content of the polyacrylate-based dispersant is in a range of from 1.5 parts by mass to 75 parts by mass with respect to 100 parts by mass of a total amount of the manganese oxide-based catalyst and the activated carbon.

According to the thirteenth aspect of the disclosure, high ozone degradation performance is imparted to the ozone-degradable coating film and furthermore air decreased in concentration of ozone can be blown.

A fourteenth aspect of the disclosure relates to the blower according to any one of the first aspect to the thirteenth aspect, wherein the resin is at least one selected from a (meth)acrylic resin or a polypropylene resin.

According to the fourteenth aspect of the disclosure, in a case in which a (meth)acrylic resin excellent in attachment ability to a metal is adopted, attachment ability of the ozone-degradable coating film to a metallic member (venting member, rotary vane, guiding member, or the like) is increased and air decreased in concentration of ozone can be continuously blown. In a case in which a polypropylene resin excellent in attachment ability to a metal and a resin is adopted, attachment ability of the ozone-degradable coating film to members including metallic and resin members (venting member, rotary vane, guiding member, and the like) is increased and air decreased in concentration of ozone can be continuously blown.

A fifteenth aspect of the disclosure relates to the blower according to any one of the first aspect to the fourteenth aspect, wherein the ozone-degradable coating film includes a cured coating film of an aqueous coating material composition including not only the manganese oxide-based catalyst, the activated carbon, the polyacrylate-based dispersant, and the resin, but also a solvent mainly containing water and a pH adjuster.

According to the fifteenth aspect of the disclosure, not only the amount of emission of VOC is suppressed and contribution to environment countermeasures is made, but also air decreased in concentration of ozone can be blown.

A sixteenth aspect of the disclosure relates to an ozone-degradable coating film-bearing article including an article body and an ozone-degradable coating film that is provided on the article body and that includes a manganese oxide-based catalyst, activated carbon, a polyacrylate-based dispersant, and a resin.

According to the sixteenth aspect of the disclosure, the ozone-degradable coating film including the above components has high ozone degradation performance, and therefore the ozone-degradable coating film provided on the article body is brought into contact with the atmosphere, thereby degrading ozone contained in the atmosphere. Thus, an environment decreased in concentration of ozone can be realized.

A seventeenth aspect of the disclosure relates to the ozone-degradable coating film-bearing article according to the sixteenth aspect, wherein the article body is a honeycomb structural member, a filter member, a duct, or a building material.

According to the seventeenth aspect of the disclosure, an environment decreased in concentration of ozone can be realized by a honeycomb structural member, a filter member, a duct, or a building material.

An eighteenth aspect of the disclosure relates to an air-conditioning system including one or more selected from the blower according to any one of the first aspect to the fifteenth aspect or the ozone-degradable coating film-bearing article according to the sixteenth aspect or the seventeenth aspect.

According to the eighteenth aspect of the disclosure, ozone contained in the atmosphere is degraded by the ozone-degradable coating film having high ozone degradation performance, and thus an environment decreased in concentration of ozone can be realized.

A nineteenth aspect of the disclosure relates to an ozone degradation method including bringing an ozone-degradable coating film including a manganese oxide-based catalyst, activated carbon, a polyacrylate-based dispersant, and a resin into contact with the atmosphere, thereby degrading ozone in the atmosphere.

According to the nineteenth aspect of the disclosure, the ozone-degradable coating film including the above components has high ozone degradation performance, and therefore the ozone-degradable coating film is brought into contact with the atmosphere, thereby degrading ozone contained in the atmosphere. Thus, an environment decreased in concentration of ozone can be realized.

A twentieth aspect of the disclosure relates to a method of forming an ozone-degradable film, including coating an object to be coated, with an aqueous coating material composition including not only a manganese oxide-based catalyst, activated carbon, a polyacrylate-based dispersant, and a resin, but also a solvent mainly containing water and a pH adjuster, and then the resulting coated object.

According to the twentieth aspect of the disclosure, an ozone-degradable coating film formed from the aqueous coating material composition including the above components has high ozone degradation performance. Thus, an environment decreased in concentration of ozone can be realized.

One aspect of the disclosure can provide a blower which can blow air decreased in concentration of ozone.

Another aspect of the disclosure can provide an ozone-degradable coating film-bearing article, an air-conditioning system, an ozone degradation method, and a method of forming an ozone-degradable film, which can each allow an environment decreased in concentration of ozone to be realized.

BRIEF DESCRIPTION OF THE DRAWINGS

Exemplary embodiments of the disclosure will be described in detail based on the following figures, wherein:

FIG. 1 is a schematic exploded perspective view illustrating one example of a blower according to the present embodiment;

FIG. 2 is a schematic cross-sectional view illustrating the periphery of a blowing unit of the blower according to the embodiment;

FIG. 3 is a schematic plan view illustrating each filter member provided as a first venting member and a second venting member in the blower according to the embodiment;

FIG. 4 is a schematic view for describing a method of an ozone degradation evaluation test in Test Examples and Comparative Examples represented in Table 1, Table 2 and Table 4;

FIG. 5 is a schematic view for describing a method of an ozone degradation evaluation test in Test Examples and Comparative Examples represented in Table 3; and FIG. 6 is a schematic configuration view illustrating one example of a building having an air-conditioning system according to the embodiment.

DETAILED DESCRIPTION

Hereinafter, an embodiment as one example of the disclosure will be described.

All members having substantially the same function as each other are herein marked with the same symbols throughout the drawings, and the descriptions thereof overlapped may be omitted.

A numerical value range herein represented by "(from) . . . to . . . " means a range including numerical values described before and after "to" as a lower limit and an upper limit, respectively.

An upper limit value described by a certain numerical value range in the form of a numerical value range described stepwise may be replaced with an upper limit value of other numerical value range described stepwise. A lower limit value described by a certain numerical value range in the form of a numerical value range described stepwise may be replaced with a lower limit value of other numerical value range described stepwise.

An upper limit value or a lower limit value described by a certain numerical value range in the form of a numerical value range may be replaced with any value represented in Examples.

Each component may include a plurality of substances corresponding thereto. In a case in which a plurality of substances corresponding to such each component are present, the content rate or content of such each component means the total content rate or content of the plurality of substances, unless particularly noted.

<Blower>

FIG. 1 is a schematic exploded perspective view illustrating one example of a blower according to the embodiment. FIG. 2 is a schematic cross-sectional view illustrating the periphery of a blowing unit of the blower according to the embodiment.

A blower 100 according to the embodiment includes a blowing unit 10, a first venting member 14, a second venting member 16, a guiding member 18, and a supporting member 20, as illustrated in FIG. 1 and FIG. 2.

The blowing unit 10 is, for example, provided in the guiding member 18, and suctions and blows air. The blowing unit 10 includes, for example, a rotary vane 12 and a driving motor not illustrated, which rotates and drives the rotary vane 12.

The rotary vane 12 is not particularly limited as long as the vane is a fan that suctions and blows air, and any well-known fan such as a centrifugal fan, an axial flow fan, a diagonal flow fan, or a cross flow fan can be adopted depending on the type of the blower 100. Specifically, examples of the rotary vane 12 can include well-known fans such as a propeller fan, a sirocco fan, a turbofan, and a line flow fan (registered trademark). The rotary vane 12 illustrated in the embodiment is here a propeller fan.

An ozone-degradable coating film 22 is provided on the vane surface of the rotary vane 12.

The first venting member 14 is, for example, provided at one end of the guiding member 18 downstream in a blowing direction of air. Specifically, the first venting member 14 is, for example, engaged to an exhaust port that exhausts air blown from the blowing unit 10, in the guiding member 18.

The first venting member 14 is, for example, configured from a honeycomb structural member having a through-hole as a first venting hole 14A through which air blown from the blowing unit 10 passes. The honeycomb structural member has a structure in which a plurality of such through-holes each having a hexagonal cross-sectional shape are arranged inside a circumferential frame section without any space.

The ozone-degradable coating film 22 is provided on a wall surface of the first venting hole 14A, namely, a wall surface of such each through-hole of the honeycomb structure, in the first venting member 14.

The second venting member 16 is, for example, provided at one end of the guiding member 18 upstream in a blowing direction of air. Specifically, the second venting member 16 is, for example, engaged to a suction port that suctions air from the blowing unit 10, in the guiding member 18.

The second venting member 16 is, for example, configured from a honeycomb structural member having a through-hole as a second venting hole 16A through which air suctioned into the blowing unit 10 passes. The honeycomb structural member has a structure in which a plurality of such through-holes each having a hexagonal cross-sectional shape are arranged without any space.

The ozone-degradable coating film 22 is provided on a wall surface of the second venting hole 16A, namely, a wall surface of such each through-hole of the honeycomb structure, in the second venting member 16.

The guiding member 18 is configured from a tubular member having an inner diameter larger than the outer diameter of the rotary vane 12 of the blowing unit 10, and includes the blowing unit 10 therein.

The guiding member 18 guides air blown from the blowing unit 10, toward the first venting member 14. The guiding member doubles as a guiding member that guides air passing through the second venting hole 16A of the second venting member 16, toward the blowing unit 10.

The ozone-degradable coating film 22 is provided on an inner wall surface of the guiding member 18.

The supporting member 20 supports, for example, the guiding member 18 in which the blowing unit 10 is provided.

The supporting member 20 is, for example, configured from a tripod stand. The supporting member 20 is not limited to a tripod stand, and may be configured from a well-known supporting member including a stand and one or a plurality of columnar or plate-like bodies that each extend from the stand and movably secure the guiding member by one end thereof.

The ozone-degradable coating film 22 includes a manganese oxide-based catalyst, activated carbon, a polyacrylate-based dispersant, and a resin.

The ozone-degradable coating film 22 is provided at least on a wall surface of the first venting hole 14A in the first venting member 14, a wall surface of the second venting hole 16A of the second venting member 16, and a vane surface of the rotary vane 12.

A coating film having high ozone degradation performance is preferably provided on a section which includes a wall surface of each venting hole of the first venting member and the second venting member in the blower 100 and which is to be brought into contact with air suctioned and exhausted, from the viewpoint that air decreased in concentration of ozone can be efficiently blown in the blower.

The detail of the ozone-degradable coating film 22 will be described below.

The blower 100 according to the embodiment, described above, is provided on each wall surface of the first venting hole 14A of the first venting member 14 and the second venting hole 16A of the second venting member 16, and includes the ozone-degradable coating film 22 including a manganese oxide-based catalyst, activated carbon, a polyacrylate-based dispersant, and a resin. The ozone-degradable coating film 22 has high ozone degradation performance due to the above components.

Air blown from the blowing unit 10 in the blower 100, when passes through the first venting hole 14A of the first venting member 14, is brought into contact with the ozone-degradable coating film 22. Thus, ozone contained in the air is degraded. Therefore, the blower 100 can blow air decreased in concentration of ozone.

Air suctioned into the blowing unit in the blower 100, when passes through the second venting hole 16A of the second venting member 16, is brought into contact with the ozone-degradable coating film 22. Thus, ozone contained in the air is degraded. Therefore, the blower 100 can blow air decreased in concentration of ozone.

In particular, the blower 100 includes both the first venting member 14 and the second venting member 16 each provided with the ozone-degradable coating film 22, and furthermore, air decreased in concentration of ozone can be blown.

The blower 100 may be here according to an aspect including at least one of the first venting member 14 or the second venting member 16 provided with the ozone-degradable coating film 22. The blower 100 may also be here according to either an aspect (1) including the first venting member 14 provided with the ozone-degradable coating film 22 and the second venting member 16 provided with no ozone-degradable coating film 22 or an aspect (2) including the first venting member 14 provided with no ozone-degradable coating film 22 and the second venting member 16 provided with the ozone-degradable coating film 22.

The blower 100 is here favorably according to an aspect including at least the first venting member 14 provided with the ozone-degradable coating film 22, from the viewpoint of blowing air more decreased in concentration of ozone.

The first venting member 14 and the second venting member 16 in the blower 100 are each configured from a honeycomb structural member. The honeycomb structural member is large in area of a wall surface of any through-hole through which air passes. In this regard, the area for coating with the ozone-degradable coating film 22 is large and the contact area with the ozone-degradable coating film 22 in passing of air through each through-hole is also increased. Thus, air decreased in concentration of ozone can be further blown.

The first venting member 14 may be configured from, for example, a filter member having a mesh hole as the first venting hole 14A through which air blown from the blowing unit 10 passes, as illustrated in FIG. 3.

The second venting member 16 may also be similarly configured from, for example, a filter member having a mesh hole as the second venting hole 16A through which air suctioned into the blowing unit 10, as illustrated in FIG. 3.

The filter member here adopted can be, for example, a well-known filter such as a fibrous filter (woven filter, unwoven filter, or the like), a metal filter, a ceramic filter, or a resin filter (encompassing a foam resin filter).

The filter member here adopted may be any of a rough filter, a medium efficiency particulate air filter, a HEPA (High Efficiency Particulate Air Filter) filter, or an ULPA (Ultra Low Penetration Air Filter) filter for any purpose.

The filter member may also be configured from a plurality of filters different in function from each other.

The ozone-degradable coating film 22 is also provided on a wall surface of the mesh hole of the filter member.

The filter member is large in area of a wall surface of the mesh hole through which air passes. In this regard, the area for coating with the ozone-degradable coating film 22 is large and the contact area of air passing through the mesh hole with the ozone-degradable coating film 22 is also increased.

Thus, the blower 100 including the filter members as the first venting member 14 and the second venting member 16 can also blow air decreased in concentration of ozone.

The honeycomb structural member is here less in pressure loss of air passing, as compared with the filter member. Thus, the blower 100 including the honeycomb structural members as the first venting member 14 and the second venting member 16 can be decreased in pressure loss and can efficiently blow air decreased in concentration of ozone.

An aspect may be adopted in which one of the first venting member 14 or the second venting member 16 is the honeycomb structural member and other thereof is the filter member. The aspect has the advantages of a decrease in cost and a decrease in weight, of the blower 100, as compared with an aspect in which both the first venting member 14 and the second venting member 16 are the honeycomb structural members. In the aspect, the ozone-degradable coating film may be provided on at least one of the honeycomb structural member or the filter member.

The first venting member 14 and the second venting member 16 are each not limited to the honeycomb structural member or the filter member, and may be each, for example, a structural member (1) in which a plurality of through-holes each having a circular or polygonal (triangular, quadrangular, or the like) cross-sectional shape are arranged in the form of the first venting hole 14A or the second venting hole 16A or a structural member (2) in which a plurality of linear or curved fins are radially or spirally provided from the center and the interval between adjacent fins is defined as the first venting hole 14A or the second venting hole 16A.

The blower 100 includes the rotary vane 12 on which the ozone-degradable coating film 22 is provided. In a case in which the rotary vane 12 is rotated, thereby suctioning and blowing air, such air is brought into contact with the ozone-degradable coating film 22. Thus, the blower 100 can blow air further decreased in concentration of ozone.

The blower 100 includes a guiding member 18 that guides air blown from the blowing unit 10, toward the first venting member 14.

The guiding member 18 can inhibit air blown from coming out of the circumference of the first venting member 14, thereby resulting in an increase in amount of air passing through the first venting hole 14A of the first venting member 14.

Thus, air decreased in concentration of ozone can be efficiently blown.

The ozone-degradable coating film 22 may also be provided on an inner wall of the guiding member 18. Thus, the blower 100 can blow air further decreased in concentration of ozone.

The blower 100 is not particularly limited as long as it can blow air, and a well-known blower such as an electric fan, a circulator, an air conditioner, an air cleaner, a radiator fan, or a ventilator is adopted therefor. The blower 100 here adopted may be a blower called a vaneless electric fan including a body section having a blowing unit and a suction port, and a ring member having a slit through which air blown from the blowing unit is exhausted.

The blower 100 is not limited also in terms of the installation configuration, and any blower having a well-known installation configuration such as floor-standing, desktop, ceiling fixing, side wall fixing, or outdoor installation is adopted therefor.

The first venting member 14 in the blower 100 may be interposed in a pathway through which air is exhausted from the blowing unit 10. The second venting member 16 may be interposed in a pathway through which air is suctioned into the blowing unit 10.

The ozone-degradable coating film 22 in the blower 100 is not limited to an aspect in which the film is provided on the first venting member 14, the second venting member 16, the rotary vane 12, and the guiding member 18.

The ozone-degradable coating film 22 may be provided at at least one of a location for contact with air blown from the blowing unit 10 or a location for contact with air suctioned into the blowing unit 10. Specifically, for example, the ozone-degradable coating film 22 may be provided on at least one of a part that forms an air suction path of the blower 100 or a part that forms an air exhaust path of the blower 100.

Thus, the blower 100 can blow air decreased in concentration of ozone.

<Ozone-Degradable Coating Film-Bearing Article>

An ozone-degradable coating film-bearing article according to the embodiment includes an article body and an ozone-degradable coating film that is provided on the article body and that includes a manganese oxide-based catalyst, activated carbon, a polyacrylate-based dispersant, and a resin.

The ozone-degradable coating film is provided on at least one portion of a surface of the article body, the surface being in contact with the atmosphere. The detail of the ozone-degradable coating film will be described below.

Representative examples of the article body on which the ozone-degradable coating film is to be provided include a honeycomb structural member, a filter member, a duct, and a building material.

Examples of the honeycomb structural member include the honeycomb structural member described with respect to the blower according to the embodiment. The ozone-degradable coating film is at least provided on an inner wall surface of each of the through-holes of the honeycomb structural member.

Examples of the filter member include the filter member described with respect to the blower according to the embodiment. The ozone-degradable coating film is at least provided on a wall surface of the mesh hole of the filter member.

An ozone-degradable coating film-bearing honeycomb structural member or filter member is mounted to, for example, an air suction unit of a blower (well-known blower such as an electric fan, a circulator, an air conditioner, an air cleaner, a radiator fan, or a ventilating fan), an air exhaust unit of a blower, an exterior unit of an air conditioner, an air exhaust unit of a virus elimination apparatus with ozone, an air exhaust unit of a copier, or an air exhaust unit of a printer.

Examples of the duct include well-known ducts such as a metallic duct, a resin duct, a cylindrical duct, a polygonal tubular duct, and a flexible duct. The ozone-degradable coating film is at least provided on, for example, an inner wall surface of the duct.

An ozone-degradable coating film-bearing duct is disposed as, for example, a supply air duct, an exhaust air duct, or an air-circulating duct of an air-conditioning system.

Examples of the building material include well-known materials such as an interior wall material, an exterior wall material, a roof material, a floor material, a ceiling material, a net door, a window, a plastic sheet for a plastic greenhouse, a curtain, and a fence. The ozone-degradable coating film is at least provided on, for example, an exposed surface of the building material.

Examples of the article body on which the ozone-degradable coating film is to be provided include not only the above, but also a part of a blower, a part of a virus elimination apparatus with ozone, a part of a copier, a part of a printer, or an agricultural material.

Examples of the part of a virus elimination apparatus with ozone, the part of a copier, and the part of a printer can include a part that forms an air exhaust unit.

Examples of the part of a blower can include a venting member, a rotary vane (fan), a guiding member, a part that forms an air suction path of a blower, an air suction path of a blower, and a part that forms an exterior unit of an air conditioner, as described with respect to the blower according to the embodiment.

Examples of the agricultural material include a sheet or net for weeding, insect repelling, photosynthesis promotion, windproofing, or warming; or a bag (produce bag, fruit bag, or the like).

The ozone-degradable coating film-bearing article according to the embodiment, described above, is disposed for any purpose of each article, and thus the ozone-degradable coating film is brought into contact with the atmosphere, thereby degrading ozone in the atmosphere. Thus, an environment decreased in concentration of ozone can be realized.

<Air-Conditioning System>

FIG. 6 is a schematic configuration view illustrating one example of a building including the air-conditioning system according to the embodiment.

A building 300 includes, for example, a ceiling chamber 304A, a first chamber 304B, and a second chamber 304C that are partitioned by partition walls 302A and 302B.

The air-conditioning system included in the building 300 includes, for example, a heat exchange type ventilator 30 that is provided in the ceiling chamber 304A and that includes a fan (not illustrated), a supply air duct 32A, an exhaust air duct 32B, and an air supply filter member 34.

The supply air duct 32A is, for example, a supply air duct for supplying air from the outside of the building 300 toward the first chamber 304B, and is connected to the ventilator 30.

The exhaust air duct 32B is a duct for exhausting air from the second chamber 304C toward the outside of the building 300, and is connected to the ventilator 30.

The air supply filter member 34 is a filter that purifies air supplied from the supply air duct 32A, and is interposed in the middle of the pathway of the supply air duct 32A.

The ventilator 30 supplies air from the outside of the building 300 through the supply air duct 32A toward the first chamber 304B, exhausts air from the second chamber 304C through the exhaust air duct 32B toward the outside of the building 300, and conditions air of each chamber in the building 300.

The air-conditioning system included in the building 300 includes, for example, an air conditioner 36 that is provided in the first chamber 304B and that includes a filter member (not illustrated), wallpaper 38, and a ceiling material 40.

The air-conditioning system included in the building 300 includes, for example, wallpaper 38 and a ceiling material 40 that are provided in the second chamber 304C.

In the air-conditioning system according to the embodiment, an ozone-degradable coating film (not illustrated) including a manganese oxide-based catalyst, activated carbon, a polyacrylate-based dispersant, and a resin is provided on a surface of the fan of the ventilator 30, an inner wall surface of the supply air duct 32A, a surface of the air supply filter member 34, a surface of the filter member of the air conditioner 36, a surface of the wallpaper 38, and a surface of the ceiling material 40.

Thus, air supplied by the ventilator 30 is brought into contact with the respective ozone-degradable coating films provided on the surface of the fan of the ventilator 30, the inner wall surface of the supply air duct 32A, and the surface of the air supply filter member 34, and is decreased in concentration of ozone.

Air blown by the air conditioner 36 is brought into contact with the ozone-degradable coating film provided on the surface of the filter member, and is decreased in concentration of ozone.

Air present in the first chamber 304B and the second chamber 304C is brought into contact with the respective ozone-degradable coating films provided on the surface of the wallpaper 38 and the surface of the ceiling material 40, and is decreased in concentration of ozone. In a case in which, for example, a virus elimination apparatus with ozone is disposed in the first chamber 304B, ozone generated in virus elimination can be effectively degraded.

The air-conditioning system according to the embodiment, described above, enables the ozone-degradable coating film to be brought into contact with air, thereby resulting in degradation of ozone in the air, and thus an environment decreased in concentration of ozone can be realized.

The air-conditioning system according to the embodiment is not limited to that of the above configuration, and may be an air-conditioning system including one or more selected from the blower according to the embodiment or the ozone-degradable coating film-bearing article according to the embodiment.

Specifically, the air-conditioning system can also be, for example, an air-conditioning system including the blower according to the embodiment included in a plastic greenhouse, and an ozone-degradable coating film-bearing plastic sheet for a plastic greenhouse.

The air-conditioning system can also be, for example, an air-conditioning system including the article according to the embodiment (for example, a part that forms an air exhaust unit (filter member or the like) in a virus elimination apparatus, or a wall material of a sterilization chamber), included in a sterilization chamber including a virus elimination apparatus in which viruses in a medical tool such as a surgical scalpel are sterilized with ozone.

The air-conditioning system can also be, for example, an air-conditioning system including the article according to the embodiment (for example, the blower according to the embodiment, or a wall material of a storeroom), included in a storeroom that stores a medical tool sterilized in a sterilization chamber.

<Ozone Degradation Method>

An ozone degradation method according to the embodiment is a method involving bringing an ozone-degradable coating film including a manganese oxide-based catalyst, activated carbon, a polyacrylate-based dispersant, and a resin into contact with the atmosphere, thereby degrading ozone in the atmosphere.

Specifically, the ozone degradation method according to the embodiment involves, for example, using one selected from the blower according to the embodiment or the ozone-degradable coating film-bearing article according to the embodiment to bring the ozone-degradable coating film into contact with the atmosphere, thereby degrading ozone in the atmosphere. More specifically, the method involves, for example, using the air-conditioning system according to the embodiment to bring the ozone-degradable coating film into contact with the atmosphere, thereby degrading ozone in the atmosphere. Thus, the ozone degradation method according to the embodiment enables an environment decreased in concentration of ozone to be realized.

<Coating Film>

Hereinafter, the ozone-degradable coating film 22 (hereinafter, also referred to as "coating film") will be described. The description is here made with the reference numeral being omitted.

The coating film includes a manganese oxide-based catalyst, activated carbon, a polyacrylate-based dispersant, and a resin. Specifically, the coating film preferably includes a cured coating film of an aqueous coating material composition (hereinafter, also simply referred to as "coating material composition") including not only a manganese oxide-based catalyst, activated carbon, a polyacrylate-based dispersant, and a resin, but also a solvent mainly containing water and a pH adjuster, from the viewpoint that the amount of emission of VOC can be suppressed and contribution to environment countermeasures can be made.

The ozone-degradable coating film includes the above components, and thus has high ozone degradation performance. The reason for this is as follows.

Both the manganese oxide-based catalyst and the activated carbon included in the coating film are components having ozone degradation ability.

A case in which the manganese oxide-based catalyst and the activated carbon are used in combination as components having ozone degradation ability enables high ozone degradation performance to be obtained as compared with a case in which the manganese oxide-based catalyst and the activated carbon are each used singly. Although the reason for this is not necessarily clear, it is, for example, considered that ozone degradation ability is enhanced according to the following reasons (1) to (4), as compared with a case in which any one of the manganese oxide-based catalyst or the activated carbon is used.

(1) An ozone catalyst reaction of the manganese oxide-based catalyst is promoted due to heat of a reaction of the activated carbon and ozone.

(2) The manganese oxide-based catalyst and the activated carbon are used in combination, whereby ozone degradation performance is obtained in a wide temperature zone.

(3) The manganese oxide-based catalyst penetrates into a pore of the activated carbon, and the activated carbon and the manganese oxide-based catalyst are efficiently brought into contact with ozone.

(4) The manganese oxide-based catalyst allows the activated carbon to be prevented from being oxidized and consumed due to, for example, active oxygen.

The manganese oxide-based catalyst and the activated carbon are required to be compounded at good dispersibility in order to increase ozone degradation ability of the coating film. Thus, not only the manganese oxide-based catalyst and the activated carbon are thus required to be high in dispersibility in the coating material composition for formation of the coating film, but also the coating material composition is required to have long-term preservability, namely, storage stability, in order to maintain such dispersibility.

In a case in which only the activated carbon is singly used as the component having ozone degradation ability, the activated carbon adsorbs to a resin content (namely, organic substance) of a coating material due to adsorption properties thereof and is aggregated, and therefore stability of such a coating material is difficult to ensure in a predetermined amount of the activated carbon for obtaining desired ozone degradation performance.

However, the activated carbon and the manganese oxide-based catalyst are used in combination to thereby decrease the amount of the activated carbon, and therefore both ozone degradation performance of the coating film and storage stability of the coating material composition can be satisfied. Such combination use enables ozone degradation performance to be exhibited for a longer period as compared with a case in which only the activated carbon is singly used.

While the manganese oxide-based catalyst is expensive and is increased in cost in a case in which only the manganese oxide-based catalyst is singly used, the activated carbon can be inexpensively available and thus such combination use of the manganese oxide-based catalyst and the activated carbon also allows the cost to be suppressed.

The manganese oxide-based catalyst and the activated carbon, which have ozone degradation performance, are each a powder in the form of particle. Such manganese oxide-based catalyst and activated carbon, which are powdery, are required to be uniformly dispersed in any component such as a resin or a solvent constituting the coating material composition in order that such manganese oxide-based catalyst and activated carbon are formed into a coating material.

However, the manganese oxide-based catalyst and the activated carbon, which are large in surface area so as to be able to considerably adsorb to ozone, are easily aggregated. In particular, the activated carbon has a pore, and thus a resin (namely, organic substance) and the manganese oxide-based catalyst which are components of the coating material composition are attached to the pore. Thus, aggregation is easily caused.

The manganese oxide-based catalyst and the activated carbon, when are low in dispersibility and are much aggregated, causes aggregation and gelation and an increase in viscosity, thereby making coating material formation difficult. In this regard, clogging of a pipe, a pump, or the like of a coating apparatus may be caused in coating. Even in a case in which coating material formation can be made, clumping and roughness occur on the coating film, the coating film is increased in thickness in coating for covering over a basis material, and not only the coating film is lack in film formability and attachment ability, but also the coating film is inferior in appearance.

The manganese oxide-based catalyst and the activated carbon, when are low in dispersibility and are much aggregated, not only are small in amount of ozone to which these can adsorb, but also cannot allow the coating film to obtain high ozone degradation performance. The manganese oxide-based catalyst and the activated carbon, when are low in dispersibility and are much aggregated, not only are naturally aggregated and gelled and increased in viscosity, but also naturally cause lack of storage stability of the coating material composition and are difficult to store for a long period.

Accordingly, the manganese oxide-based catalyst and the activated carbon which are powdery are preferably highly dispersed in coating material formation in order that the manganese oxide-based catalyst and the activated carbon are prevented from being aggregated.

In a case in which the polyacrylate-based dispersant is compounded together with the manganese oxide-based catalyst and the activated carbon, not only the manganese oxide-based catalyst and the activated carbon can be prevented from being aggregated (namely, disaggregation) even in any resin-containing coating material composition, but also the manganese oxide-based catalyst and the activated carbon can be finely and highly dispersed in such a coating material composition. In this regard, dispersion stability can also be increased.

Such high dispersing and dispersion stability of the manganese oxide-based catalyst and the activated carbon due to the polyacrylate-based dispersant are considered to occur due to, for example, (1) adsorption of the polyacrylate-based dispersant to the manganese oxide-based catalyst and the activated carbon due to electrical repulsion or (2) steric hindrance due to, for example, an anchor group and/or a polymer chain of polyacrylate. In other words, it is considered that, for example, adsorption and steric hindrance due to the polyacrylate-based dispersant inhibit the manganese oxide-based catalyst and the activated carbon from being aggregated (namely, disaggregation) and allow the manganese oxide-based catalyst and the activated carbon to be stabilized at fine particle sizes.

In particular, the polyacrylate-based dispersant is a high molecular weight substance and has a plurality of adsorption sites. Thus, the polyacrylate-based dispersant adsorbs to the manganese oxide-based catalyst and the activated carbon even in an amount of use at a low concentration, thereby enabling the manganese oxide-based catalyst and the activated carbon to be highly dispersed, and is not required to be used at a high concentration. Thus, the polyacrylate-based dispersant hardly inhibits ozone from adsorbing to the manganese oxide-based catalyst and the activated carbon.

Thus, the polyacrylate-based dispersant enables the manganese oxide-based catalyst and the activated carbon to be sufficiently disaggregated and stabilized in the coating material composition. In other words, the manganese oxide-based catalyst and the activated carbon can be finely and highly dispersed.

For example, the dispersion degree of the manganese oxide-based catalyst and the activated carbon in the coating material composition, as measured by a line transect method with a grind gauge (specifically, grind gauge according to JISK 5600 and JISK 5400 (1990)), can be 20 µm or less in terms of maximum particle size (Dmax).

Each 90% cumulative particle size (D90) on a volume basis, of the manganese oxide-based catalyst and the activated carbon in the coating material composition, according to a laser analysis method (specifically, laser analysis method with a laser diffraction particle size distribution measurement apparatus) can be 10 µm or less.

Such a coating film formed from the coating material composition in which the manganese oxide-based catalyst and the activated carbon are highly dispersed at fine particle sizes exhibits high ozone degradation performance, because the manganese oxide-based catalyst and the activated carbon are compounded at good dispersibility and the amount of adsorption of ozone to the manganese oxide-based catalyst and the activated carbon is increased. The coating film is suppressed in clumping and roughness, and secures excellent film formability and attachment ability to a substrate. The coating film is favorable in smoothness and the coating film also achieves a favorable appearance.

The coating material composition using the polyacrylate-based dispersant is high in Dispersion Stability of the Manganese Oxide-Based Catalyst and the Activated Carbon and is not re-aggregated, and thus is also high in storage stability and can be stored for a long period.

From the foregoing, the coating film including the above components has high ozone degradation performance.

Hereinafter, the detail of the coating film will be described.

(Manganese Oxide-Based Catalyst/Activated Carbon)

The manganese oxide-based catalyst degrades ozone and converts ozone into oxygen by (1) adsorption of ozone, (2) a decrease in active energy of a self-degradation reaction of ozone, and (3) a degradation and elimination reaction of ozone. Thus, ozone can be removed and detoxified.

The activated carbon converts ozone into, for example, carbon monoxide, carbon dioxide (carbon dioxide gas), active oxygen, and/or oxygen by (1) adsorption of ozone to a pore or (2) a reaction of ozone adsorbing to the activated carbon with the activated carbon, or acceptance of an electron from the activated carbon to ozone (namely, a decrease in active energy of a self-degradation reaction of ozone). Thus, ozone can be removed and detoxified.

While the manganese oxide-based catalyst has the highest activity in a high temperature region (for example, around 80° C.), the activated carbon has a high activity not only in a wide temperature region including ordinary temperature (from 15 to 25° C.), but also in a high humidity environment.

The coating film including the manganese oxide-based catalyst and the activated carbon can thus degrade and remove ozone.

—Manganese Oxide-Based Catalyst—

Examples of the manganese oxide ($Mn_xO_y$)-based catalyst include a manganese monoxide (MnO)-based catalyst, a manganese dioxide (manganese oxide (IV))-based catalyst, and a spinel-type metal manganate-based catalyst.

In particular, the manganese oxide-based catalyst is preferably a manganese dioxide ($MnO_2$)-based catalyst which is high in catalytic activity and which allows ozone degradation ability of the coating film to be enhanced. Any oxide of manganese, commonly called manganese dioxide, is a non-stoichiometric compound, and actually has a composition of $MnO_x$ (x=about 1.93 to 2).

Such manganese dioxide here used may be any of natural manganese dioxide, manganese dioxide produced according to an electrolytic method or a chemical synthesis method, amorphous manganese dioxide, or manganese dioxide including a crystal structure. Examples of the crystal structure of the manganese dioxide include alfa-type, beta-type, gamma-type, and delta-type, more preferably α-manganese dioxide (cryptomelane-type manganese dioxide). Such manganese dioxide may have an amorphous structure.

The manganese oxide-based catalyst may be a catalyst which is based on manganese oxide (for example, $MnO_2$) and which includes a co-catalyst such as NiO, CuO, or AgO as a co-catalyst.

The manganese oxide-based catalyst may be a catalyst including, for example, calcium oxide to which moisture adsorbs.

The manganese oxide-based catalyst is here a catalyst preferably containing manganese oxide at a content of 70% or more, more preferably 80% or more.

The specific surface area of the manganese oxide-based catalyst is preferably from 100 $m^2/g$ to 400 $m^2/g$, as measured according to a $N_2$ adsorption BET method.

A specific surface area of 400 $m^2/g$ or less allows for suppression of aggregation of the catalyst and enhancements in dispersibility and dispersion stability of the catalyst in the coating material composition. Such enhancements in dispersibility and dispersion stability of the catalyst allow the catalyst to be compounded at good dispersibility in the coating film and allow ozone degradation performance of the coating film to be increased. An enhancement in dispersibility of the catalyst hardly causes clogging in a coating apparatus with the coating material composition and coating material clumping (namely, aggregated article) on the surface of the coating film, resulting in increases in formability and attachment ability of the coating film. In this regard, not only lack and peeling of the coating film, but also dripping of the catalyst is suppressed. An enhancement in dispersion stability of the catalyst allows for an increase in storage stability of the coating material composition.

A specific surface area of 100 $m^2/g$ or more allows for a further increase in ozone degradation performance of the coating film.

In a case in which the manganese oxide-based catalyst, which has a specific surface area in a range of from 100 $m^2/g$ to 400 $m^2/g$ as measured according to a $N_2$ adsorption BET method, is applied, the coating film is good in film formability and attachment ability, dripping of the catalyst is hardly caused, and high ozone degradation performance can be more effectively obtained continuously. The coating material composition can also obtain favorable storage stability.

The specific surface area of the manganese oxide-based catalyst is more preferably from 150 $m^2/g$ to 350 $m^2/g$, still more preferably from 180 $m^2/g$ to 300 $m^2/g$.

The median size (average particle size) of the manganese oxide-based catalyst is preferably from 1 μm to 20 μm.

A median size of 20 μm or less allows for not only an increase in specific surface area of the catalyst and a further increase in ozone degradation performance of the coating film, but also enhancements in formability and attachment ability of the coating film, thereby hardly causing peeling of the coating film and dripping of the catalyst.

A median size of 1 μm or more allows for enhancements in dispersibility and dispersion stability of the catalyst in the coating material composition. Such enhancements in dispersibility and dispersion stability of the catalyst allow the catalyst to be compounded at good dispersibility in the coating film and allow ozone degradation performance of the coating film to be increased. An enhancement in dispersibility of the catalyst hardly causes clogging in a coating apparatus with the coating material composition and coating material clumping (namely, aggregated article) on the surface of the coating film, resulting in increases in formability and attachment ability of the coating film. In this regard, not only lack and peeling of the coating film, but also dripping of the catalyst is suppressed. An enhancement in dispersion stability of the catalyst allows for an increase in storage stability of the coating material composition.

In a case in which the manganese oxide-based catalyst, which has a median size (average particle size) in a range of from 1 μm to 20 μm, is applied, the coating film is good in film formability and attachment ability, dripping of the catalyst is hardly caused, and high ozone degradation performance can be more effectively obtained continuously. The coating material composition can also obtain favorable storage stability.

The median size (average particle size) of the manganese oxide-based catalyst is more preferably from 3 μm to 18 μm, still more preferably from 5 μm to 15 μm.

In a case in which the manganese oxide-based catalyst, which has a median size (average particle size) in a range of from 1 µm to 20 µm and has a specific surface area in a range of from 100 to 400 m²/g according to the BET method, the catalyst is particularly compounded in the coating film at good dispersibility and high ozone degradation performance can be obtained.

—Activated Carbon—

Examples of the activated carbon include activated carbon including, as a raw material, for example, sawdust, wood chips, charcoal, bamboo charcoal, coal (lignite, brown coal, soft coal), petroleum (petroleum pitch, oil carbon, or the like), walnut shell charcoal, palm shell charcoal, a resin (phenol resin, epoxy resin, or the like), or rayon.

The activated carbon may be, for example, any activated carbon which supports, for example, an organic metal complex with, for example, cobalt or iron as a central metal.

In particular, the activated carbon is preferably, for example, palm shell activated carbon, petroleum pitch-based activated carbon, or wood-based activated carbon very high in specific surface area for ozone adsorption, and is preferably palm shell activated carbon which has a rate of carbon of 90% or more and which includes, for example, coconut palm, oil palm, or sago palm containing many carbon components, as a raw material.

The specific surface area of the activated carbon is preferably from 500 m²/g to 3000 m²/g as measured according to a $N_2$ adsorption BET method.

A specific surface area of 3000 m²/g or less allows for suppression of aggregation of the activated carbon and enhancements in dispersibility and dispersion stability of the activated carbon in the coating material composition. Such enhancements in dispersibility and dispersion stability of the activated carbon allow the activated carbon to be compounded in the coating film at good dispersibility and allow ozone degradation performance of the coating film to be increased. An enhancement in dispersibility of the activated carbon hardly causes clogging in a coating apparatus of the coating material composition and coating material clumping (namely, aggregated article) on the surface of the coating film, resulting in increases in formability and attachment ability of the coating film. In this regard, not only lack and peeling of the coating film, but also dripping of the activated carbon is suppressed. An enhancement in dispersion stability of the activated carbon allows for an increase in storage stability of the coating material composition.

A specific surface area of 500 m²/g or more allows for a further increase in ozone degradation performance of the coating film.

In a case in which the activated carbon, which has a specific surface area in a range of from 500 m²/g to 3000 m²/g as measured according to a $N_2$ adsorption BET method, is applied, the coating film is good in film formability and attachment ability, dripping of the catalyst is hardly caused, and high ozone degradation performance can be more effectively obtained continuously. The coating material composition can also obtain favorable storage stability.

The specific surface area of the activated carbon is more preferably from 600 m²/g to 2500 m²/g, still more preferably from 900 m²/g to 2000 m²/g.

The total pore volume of the activated carbon is preferably in a range of from 0.1 cm³/g to 1.5 cm³/g, more preferably in a range of from 0.2 cm³/g to 1.0 cm³/g, as calculated from the amount of adsorption of nitrogen at a relative pressure P/P0 of 1.0 in nitrogen adsorption isotherm according to nitrogen BET.

The average pore size (average pore size calculated by total pore volume/BET specific surface area×4) of the activated carbon is preferably from 0.3 to 10 nm, more preferably from 0.5 to 5 nm from the viewpoints of adsorption ability of ozone and prevention of clogging due to, for example, a particulate substance in the atmosphere.

The median size (average particle size) of the activated carbon is preferably from 1 µm to 20 µm.

A median size of 20 µm or less allows for not only an increase in specific surface area of the activated carbon and a further increase in ozone degradation performance of the coating film, but also enhancements in formability and attachment ability of the coating film, thereby hardly causing peeling of the coating film and dripping of the activated carbon.

A median size of 1 µm or more allows for enhancements in dispersibility and dispersion stability of the activated carbon in the coating material composition. Such enhancements in dispersibility and dispersion stability of the catalyst allow the activated carbon to be compounded in the coating film at good dispersibility and allow ozone degradation performance of the coating film to be increased. An enhancement in dispersibility of the activated carbon hardly causes clogging in a coating apparatus with the coating material composition and coating material clumping (namely, aggregated article) on the surface of the coating film, resulting in increases in formability and attachment ability of the coating film. In this regard, not only lack and peeling of the coating film, but also dripping of the activated carbon is suppressed. An enhancement in dispersion stability of the activated carbon allows for an increase in storage stability of the coating material composition.

In a case in which the activated carbon, which has a median size (average particle size) in a range of from 1 µm to 20 µm, is applied, the coating film is good in formability and attachment ability of the coating film, dripping of the catalyst is hardly caused, and high ozone degradation performance can be more effectively obtained continuously. The coating material composition can also obtain favorable storage stability.

The median size (average particle size) of the activated carbon is more preferably from 3 µm to 18 µm, still more preferably from 5 µm to 15 µm.

In a case in which the activated carbon, which has a median size (average particle size) in a range of from 1 µm to 20 µm and a specific surface area in a range of from 500 to 3000 m²/g according to the BET method, is thus used, in particular, the activated carbon can be compounded in the coating film at good dispersibility and the coating film can obtain high ozone degradation performance.

—Method of Measuring of Specific Surface Areas of Manganese Oxide-Based Catalyst and Activated Carbon—

The "specific surface area" is a specific surface area measured according to a $N_2$ adsorption BET method. The BET (Brunauer-Emmett-Teller) method is a method involving allowing any molecule whose adsorption occupying area is known to adsorb to a particle surface at a temperature corresponding to that of liquid nitrogen, and determining the specific surface area of a sample from the amount of such adsorption, and is a method of determining such a specific surface area from low-temperature physical adsorption of nitrogen.

—Method of Measuring of Median Sizes (Average Particle Sizes) of Manganese Oxide-Based Catalyst and Activated Carbon—

The "median size" is a particle size (diameter) at which the number (or mass) of particles larger in size than a certain particle size corresponds to 50% relative to the total powder in a powder particle size distribution, namely, 50%-oversized particle size, according to the term definition in the text and comment in "Test Powders and Test Particles" in JIS Z 8901, and is usually called median size or 50% particle size and is represented by D50.

While the size of a particle group is definitionally represented by the average particle size and the median size, the "median size" is herein a value displayed as the item description or measured according to a laser diffraction-scattering method. The "median size measured according to a laser diffraction-scattering method" refers to a particle size (D50) at which a cumulative weight in a particle size distribution obtained by a laser diffraction-scattering method with a laser diffraction particle size distribution measurement apparatus corresponds to 50%.

The numerical value is not critical and there is any error with respect to each product, and it is not denied that any error corresponding to about one tenth or less, which includes an error due to measurement or the like, is incorporated. Any normal distribution is presented from the viewpoint of such an error and the particle size is represented in such a normal distribution, and therefore, even in a case in which the median size is substantially equal to the average particle size, the difference between both such sizes is within several percentages and is simply regarded as an error.

—Contents of Manganese Oxide-Based Catalyst and Activated Carbon—

The compounding ratio of the activated carbon to the manganese oxide-based catalyst in terms of a mass ratio preferably satisfies 20/80≤activated carbon/manganese oxide-based catalyst≤80/20, more preferably 30/70≤activated carbon/manganese oxide-based catalyst≤70/30.

In a case in which the compounding ratio of the activated carbon to the manganese oxide-based catalyst is in the range, in particular, the synergistic effect of ozone degradability due to a combination of the manganese oxide-based catalyst and the activated carbon can be obtained and high ozone degradation performance can be obtained.

The total amount of the manganese oxide-based catalyst and the activated carbon with respect to the coating film is preferably from 60% by mass to 90% by mass, more preferably from 65% by mass to 85% by mass, still more preferably from 70% by mass to 80% by mass.

In a case in which the total amount of the manganese oxide-based catalyst and the activated carbon is in the range, in particular, high ozone degradation performance can be obtained without any loss of attachment ability of the coating film.

(Polyacrylate-Based Dispersant)

The polyacrylate-based dispersant is a dispersant which enables the manganese oxide-based catalyst and the activated carbon to be highly dispersed.

The polyacrylate-based dispersant is, for example, a dispersant based on a salt of polyacrylate, an acrylic backbone, or a modified acrylic backbone. The polyacrylate-based dispersant also encompasses a modified polyacrylate-based dispersant.

The polyacrylate-based dispersant preferably has a weight average molecular weight of from 5000 to 30000.

The polyacrylate-based dispersant, which has a higher molecular weight, has a plurality of adsorption sites in its molecule, and thus can adsorb to the manganese oxide-based catalyst and the activated carbon at many sites even at a low concentration of the dispersant and can be inhibited from being aggregated.

The polyacrylate-based dispersant, which has a weight average molecular weight of 5000 or more, sufficiently has such a plurality of adsorption sites in its molecule, and thus has increased adsorption sites and further increases dispersibility of the manganese oxide-based catalyst and the activated carbon. Thus, ozone degradation performance of the coating film is further increased.

The polyacrylate-based dispersant, which has a weight average molecular weight of 30000 or less, can suppress decreases in compatibility and affinity between the dispersant and the coating material component of the coating material composition and suppress a decrease in dispersibility of the manganese oxide-based catalyst and the activated carbon. Thus, a decrease in ozone degradation performance of the coating film can be suppressed.

In a case in which the polyacrylate-based dispersant, which has a weight average molecular weight in a range of from 5000 to 30000, is applied, compatibility with other material is also good and furthermore dispersibility of the manganese oxide-based catalyst and the activated carbon can be enhanced.

The polyacrylate-based dispersant more preferably has a weight average molecular weight of from 6000 to 28000, still more preferably from 7000 to 25000.

The weight average molecular weight (Mw) is a value obtained by performing measurement according to a gel permeation chromatography (GPC; GEL permeation chromatography) method and converting a chromatogram obtained by GPC measurement into the molecular weight of standard polystyrene.

The polyacrylate-based dispersant preferably has an acid value of from 1 to 50. The reason is because deterioration in adsorption ability of the dispersant, which may be caused due to the polarity of other material, for example, an additive such as a pigment can be suppressed. Such a dispersant, which has an acid value in a range of from 1 to 50, can be thus applied, thereby allowing dispersion stability of the catalyst and the activated carbon to be ensured without any effect on the type of the additive.

The polyacrylate-based dispersant more preferably has an acid value of from 3 to 48, still more preferably from 5 to 45.

The acid value of the polyacrylate-based dispersant is here a value measured with a neutralization titration method according to JIS K0070.

The polyacrylate-based dispersant preferably has a hydrogen-ion exponent of from pH 4 to pH 9. The reason is, for example, because deterioration in dispersibility of an additive such as a pigment can be suppressed. Such a dispersant, which has a hydrogen-ion exponent in a range of from pH 4 to pH 9, can be thus applied, thereby allowing dispersion stability of an additive to be ensured without any effect on the type of the additive.

The polyacrylate-based dispersant more preferably has a hydrogen-ion exponent of from pH 4.5 to pH 8.5, still more preferably from pH 5 to pH 8.

The hydrogen-ion exponent of the polyacrylate-based dispersant is a value obtained by subjecting a resin dilution (an emulsion, a dispersion, an aqueous solution, or the like) having a resin concentration of from about 1% to 99% at a liquid temperature of 25° C., to measurement.

In a case in which the polyacrylate-based dispersant, which has a weight average molecular weight of in a range of from 5000 to 30000, an acid value in a range of from 1 to 50, and a hydrogen-ion exponent in a range of from pH 4 to pH 9, is applied, in particular, high ozone degradation performance can be obtained without any loss of attachment ability of the coating film. Such a case also improves dispersibility of each component of the coating material composition.

Examples of a commercially available product of such a polyacrylate-based dispersant include DISPERBYK of BYK-Chemie, EFKA of Ciba Specialty Chemicals or EFKA ADDITIVES B.V, DISPARLON of Kusumoto Chemicals, Ltd., and SN THICKENER of SAN NOPCO LIMITED.

The content of the polyacrylate-based dispersant is preferably from 1.5 parts by mass to 75 parts by mass, more preferably from 2 parts by mass to 60 parts by mass, still more preferably from 2.5 parts by mass to 50 parts by mass, with respect to 100 parts by mass of the total amount of the manganese oxide-based catalyst and the activated carbon.

In a case in which the content of the polyacrylate-based dispersant is in the range, not only high ozone degradability of the coating film can be imparted, but also high ozone degradability of the coating film and high storage stability of the coating material composition can be simultaneously satisfied.

(Resin)

The resin is a resin which binds the manganese oxide-based catalyst and the activated carbon in the coating film. The resin is preferably an aqueous resin. The aqueous resin may be either a water-soluble resin soluble in water or a water-dispersible resin dispersible in water.

Examples of the resin include an epoxy resin, an epoxy ester resin, a polyester resin, a (meth)acrylic resin (namely, acrylic resin and methacrylic resin), an acrylic silicone resin, a polyester resin, a polyurethane resin, an alkyd resin, a urethane resin, a vinyl resin, a urea-based resin, a styrene-butadiene-latex (SBR), and an acrylonitrile-butadiene rubber (NBR). Such resins may be used singly, or in combination of two or more kinds thereof.

The resin may be added in any form of a water-soluble resin (or an aqueous water-soluble resin solution), an emulsion resin, or a dispersion resin, to the coating material composition. While the "emulsion" may also be referred to as "emulsified liquid" and originally means any one (namely, dispersion system) in which a liquid particle is emulsified in the form of a colloid particle or a coarser particle, in a liquid (Saburo Nagakura et al., "Iwanami Physics and Chemistry Dictionary (fifth edition)", page 152, published by Iwanami Shoten Publishing Ltd., on Feb. 20, 1998), the term "emulsion" herein used means a dispersion of a solid or liquid particle in a liquid, commonly used in a wider sense.

The resin is preferably a (meth)acrylic resin or a polypropylene resin, in particular, in terms of compatibility and dispersibility of the manganese oxide-based catalyst and the activated carbon, weather resistance of the coating film, the cost, attachment ability of the coating film, and dispersion stability of each component. A (meth)acrylic resin is excellent in attachment ability to a metal, and a polypropylene resin is excellent in attachment ability to a metal and a resin.

Thus, the coating film, which includes a (meth)acrylic resin, is high in attachment ability to a metallic member (venting member, rotary vane, guiding member, or the like). The coating film, which includes a polypropylene resin, is high in attachment ability to a metallic or resin member (venting member, rotary vane, guiding member, or the like).

The (meth)acrylic resin widely encompasses an acrylic resin and a methacrylic resin.

The acrylic resin means a homopolymer or copolymer of any (meth)acrylic monomer selected from (meth)acrylic acid (which means acrylic acid or methacrylic acid, much the same is true on the following.) or (meth)acrylate (which means acrylate or methacrylate, much the same is true on the following.), or a copolymer of a (meth)acrylic monomer and a monomer copolymerizable with the (meth)acrylic monomer.

Examples of the (meth)acrylate include methyl (meth)acrylate, ethyl (meth)acrylate, propyl (meth)acrylate, isopropyl (meth)acrylate, n-butyl (meth)acrylate, isobutyl (meth)acrylate, pentyl (meth)acrylate, hexyl (meth)acrylate, ethylhexyl (meth)acrylate, 2-hydroxyethyl (meth)acrylate, hydroxypropyl (meth)acrylate, 3-hydroxybutyl (meth)acrylate, 2,2-bis(hydroxymethyl)ethyl (meth)acrylate, 3-chloro-2-hydroxypropyl (meth)acrylate, glycidyl (meth)acrylate, aminoethyl (meth)acrylate, aminopropyl (meth)acrylate, dimethylaminoethyl (meth)acrylate, diethylaminoethyl (meth)acrylate, methoxyethyl (meth)acrylate, methoxypropyl (meth)acrylate, methoxybutyl (meth)acrylate, and stearyl (meth)acrylate.

The monomer copolymerizable with the (meth)acrylic monomer is preferably a monomer having an ethylenically unsaturated group, and examples thereof include ethylene, propylene, butylene, butadiene, styrene, α-methylstyrene, vinyl phenol, vinyl chloride, vinylidene chloride, vinyl acetate, vinyl pivalate, vinyl benzoate, vinyl alcohol, allyl alcohol, crotonic acid, itaconic acid, maleic acid, fumaric acid, (meth)acrylamide, N-methylolacrylamide, N-butoxymethylol(meth)acrylamide, and (meth)acrylonitrile. The copolymerization method is commonly emulsion polymerization, but is not limited thereto. The acid here used may be in the form of, for example, an alkali metal salt or an alkali earth metal salt.

The (meth)acrylic resin may be, for example, any of a urethane-modified (meth)acrylic resin, an epoxy-modified (meth)acrylic resin, a phenol-modified (meth)acrylic resin, and a melamine-modified (meth)acrylic resin modified with a urethane resin, an epoxy resin, a phenol resin, and a melamine resin, respectively.

The (meth)acrylic resin is preferably a weakly alkaline (meth)acrylic resin having a hydrogen-ion exponent in a range of from pH 7 to pH 9. The weakly alkaline (meth)acrylic resin is high in dispersibility in water as a solvent of the coating material composition, and thus is formed into a dense coating film favorable in formability and uniformity and is increased in attachment ability to a metal substrate.

The hydrogen-ion exponent of the (meth)acrylic resin is a value obtained by subjecting a resin dilution (an emulsion, a dispersion, an aqueous solution, or the like) having a resin concentration of from about 1% to 99% at a liquid temperature of 25° C., to measurement.

The (meth)acrylic resin to be added to the coating material composition, here used, is preferably a resin having a median size (average particle size) in a range of from 50 nm to 150 nm. Such a range allows dispersibility of a resin content in water to be high, allows the coating film to be favorable in formability and uniformity, and enables the coating film to exhibit, for example, attachment ability to a metal substrate.

The (meth)acrylic resin more preferably has a median size (average particle size) of from 60 nm to 140 nm, still more preferably from 70 nm to 130 nm.

Examples of the polypropylene resin include a homopolymer obtained by polymerization of only propylene, a random polymer obtained by copolymerization with a small amount of ethylene or the like, and a block copolymer in which a rubber component (EPR) is dispersed in a homo/random polymer. The polypropylene resin here also encompasses a modified polypropylene resin and a chlorinated polypropylene resin.

The polypropylene resin is preferably a weakly alkaline polypropylene resin having a hydrogen-ion exponent in a range of from pH 7 to pH 9. The weakly alkaline polypropylene resin is high in dispersibility in water as a solvent of the coating material composition, and thus is formed into a dense coating film favorable in film formability and uniformity and is increased in attachment ability to a metal substrate.

The hydrogen-ion exponent of the polypropylene resin is a value obtained by subjecting a resin dilution (an emulsion, a dispersion, an aqueous solution, or the like) having a resin concentration of from about 1% to 99% at a liquid temperature of 25° C., to measurement.

The weakly alkaline polypropylene resin to be added to the coating material composition, here used, is preferably a resin having a median size (average particle size) in a range of from 50 nm to 150 nm. Such a range allows dispersibility of a resin content in water to be high, allows the coating film to be favorable in formability and uniformity, and enables the coating film to exhibit, for example, attachment ability to a metal substrate.

The weakly alkaline polypropylene resin more preferably has a median size (average particle size) of from 60 nm to 140 nm, still more preferably from 70 nm to 130 nm.

The content of the resin is, for example, preferably in a range of from 5 parts by mass to 100 parts by mass, more preferably in a range of from 10 parts by mass to 50 parts by mass with respect to 100 parts by mass of the total amount of compounding of the manganese oxide-based catalyst and the activated carbon (the total amount of compounding of the solid content).

In a case in which the content of the resin is 5% by mass or more, favorable attachment ability to a substrate is easily obtained, and not only peeling and lack of the coating film, but also dripping of the manganese oxide-based catalyst and the activated carbon can be further suppressed.

In a case in which the content of the resin is 100 parts by mass or less, a decrease in ozone degradation ability of the coating film can be further suppressed.

Thus, the above content of the resin is preferable in that the coating film can easily satisfy both attachment ability and ozone degradability.

(pH Adjuster)

The pH adjuster provides neutralization, thereby allowing the manganese oxide-based catalyst and the activated carbon to be suppressed in sedimentation due to a decrease in viscosity of the coating material composition. Thus, the manganese oxide-based catalyst and the activated carbon are easily kept in the coating material composition at high dispersibility.

The pH adjuster is a compound which adjusts the hydrogen-ion exponent of the coating material composition for forming the coating film in a range of from pH 7 to pH 12, more preferably from pH 8 to pH 11.5, still more preferably from pH 9.5 to pH 11. The pH adjuster is a compound encompassing a neutralizing agent in terms of a category.

Examples of the pH adjuster include low-boiling point amine such as triethylamine (TEA); ammonia; and dimethylaminoethanol.

(Other Component)

The coating film may include various additives other than the above components.

The coating film may include, for example, any pigment such as a coloring pigment, an antirust pigment, an extender pigment, or a functional pigment, for enhancements in, for example, antirust properties and chipping resistance. The coating film may include an additive for enhancements in coatability of the coating material composition for forming the coating film and in performance of the coating film.

Examples of the coloring pigment include carbon black, titanium oxide, iron oxide, zinc oxide, an organic azochelate-based pigment, an insoluble azo-based pigment, a condensed azo-based pigment, a diketopyrrolopyrrole-based pigment, a benzimidazolone-based pigment, a phthalocyanine-based pigment, an indigo pigment, a perinone-based pigment, a perilene-based pigment, a dioxane-based pigment, a quinacridone-based pigment, an isoindolinone-based pigment, a metal complex pigment, lead yellow, yellow iron oxide, colcothar, and titanium dioxide.

Examples of the antirust pigment include zinc phosphate, zinc phosphite, aluminum polyphosphate, aluminum tri polyphosphate, calcium zinc molybdate, zinc orthophosphate, zinc polyphosphate, zinc molybdate, zinc phosphomolybdate, aluminum phosphomolybdate, zinc oxide, phosphorus/zinc silicate, aluminum zinc phosphate, calcium zinc phosphate, zinc calcium cyanamide, barium metaborate, and magnesium amino phosphate.

The antirust pigment is preferably an antirust pigment not including any hazardous heavy metal, such as a chromium-based antirust pigment, from the viewpoint of environmental protection.

The content of the antirust pigment in the coating film is preferably 30% by mass or less, more preferably 20% by mass or less. In a case in which the content of the antirust pigment is in the range, the coating material composition is good also in stability.

Examples of the extender pigment include talc, calcium carbonate, barium sulfate, calcium sulfate, mica, clay, silica, diatomous earth, alumina, baryta, and silicon dioxide.

In particular, the extender pigment is preferably talc. Talc can form a stack of many layers in the coating film, and can prevent any corrosion factor from entering the coating film, by denseness of such layers formed by arranging talc.

Examples of such other additive include a viscosity modifier, a film growth aid, a dispersant which mainly allows for dispersing of the pigment, a defoamer, a filler, a plasticizer, an anti-dripping agent, a film formation aid, a thixotropic agent, a leveling agent, a pH adjuster, a neutralizing agent, an ultraviolet absorber, an ultraviolet stabilizer, an anti-sedimentation agent, an adhesion ability imparting agent, a curing catalyst, a neutralizing agent, a drier (namely, drying agent), a stabilizer, and a surface conditioner (namely, coating film surface conditioner).

Examples of such a dispersant which mainly allows for more dispersing of the pigment include a polycarboxylic acid-based dispersant.

Examples of the defoamer include a silicon-based defoamer and an acrylic defoamer. Such a defoamer can prevent any fine bubble occurring during mixing in preparation of the coating material composition from causing the coating material composition to be ununiform, thereby allowing viscosity and fluidity to be adjusted. Such defoaming also suppresses any bubble. Thus, any rust due to moisture coming from bubble can be prevented from occurring, and the coating film can be enhanced in antirust properties.

Examples of the drier (namely, drying agent) include a metal drier (namely, metal drying agent) such as cobalt naphthenate or lead naphthenate. Such a drier can promote drying at a stage in which the coating film is formed by coating with the coating material composition, and can promote further polymerization of an aqueous resin and thus formation of a dense coating film.

Examples of the stabilizer include an alkanolamine derivative (for example, diisopropanolamine, ethanolamine, diethanolamine, triisopropanolamine, or triethanolamine), and the stabilizer can stabilize the coating material composition by preparation of, for example, fluidity, viscosity, or dispersibility. The alkanolamine derivative can also serve as an initial antirust agent.

(Method of Producing Coating Material Composition for Forming Coating Film)

One example of the method of producing the coating material composition is described, but is not limited thereto.

The method of producing the coating material composition involves, for example, first performing a dispersing step of mixing a solvent mainly containing water, a manganese oxide-based catalyst, activated carbon, and a polyacrylate-based dispersant, stirring the mixture by a dispersing machine, and dispersing the catalyst and the activated carbon.

The solvent mainly containing water here is a solvent containing 50% by mass or more, 75% by mass or more, 90% by mass or more, 95% by mass or more, or 100% by mass of water with respect to the entire solvent.

Examples of the dispersing machine for use in the dispersing step include a ball mill, a bead mill, a high-pressure injector, a dissolver, a Bunbury mixer, a planetary mixer, a butterfly mixer, a spiral mixer, a roll mill, a sand mill, a paint shaker, a grain mill, a high-speed impeller mill, an open kneader, a vacuum kneader, an attritor, a high-speed disperser, a homomixer, a homogenizer, a colloid mill, a microfluidizer, a sonolator, and a cavitron.

The dispersing machine is preferably a bead mill or a roll mill. Such a bead mill or roll mill can allow the manganese oxide-based catalyst and the activated carbon to be dispersed at predetermined fine sizes by a small amount of energy.

Next, a neutralization step is performed which involves mixing the mixture undergoing the dispersing step with a pH adjuster (namely, neutralizing agent).

It is preferable in the neutralization step to adjust the hydrogen-ion exponent of the coating material composition in a range of from pH 7 to pH 12, more preferably from pH 8 to pH 11.5, still more preferably from pH 9.5 to pH 11, by a pH adjuster. The reason is because not only sedimentation of the coating material component due to a decrease in viscosity of the coating material composition can be prevented, but also uniform dispersing and stabilization of the coating material composition can be made and uniform performance of the coating film after coating can be easily ensured.

Next, a coating material formation step is performed which involves mixing the mixture undergoing the neutralization step with a resin and stirring the resultant by a stirrer. In the coating material formation step, the mixture undergoing the neutralization step is mixed with such a resin and, if necessary, any of various additives.

An objective coating material composition is obtained through the above steps.

(Method of Forming Coating Film)

The method of forming the coating film is not particularly limited, and a method is adopted which involves coating an object to be coated, with the coating material composition, and then the resulting coated object.

The coating method here adopted can be any known coating method.

Examples of such any known coating method include an air spray method, a shower method, a spray method, a roll coating method, a curtain flow coating method, a die coating method, a brush coating method, a dipping method, a squeezing method, a knife coater method, a bar coating method, and an electrostatic coating method.

A predetermined section for coating in the object to be coated is coated at any amount of coating and any thickness in any coating form according to such any known coating method.

A film formed by coating with the coating material composition is cured with removal of the solvent by natural drying, heating drying, or a drying machine. Thus, an objective coating film can be formed.

TEST EXAMPLES

A coating film having ozone degradation ability and an aqueous coating material composition for formation of the coating film are here further specifically described with reference to Test Examples.

Test Examples 1 to 3 and Comparative Examples 1 to 6

First, the formulation of each aqueous coating material composition for formation of a coating film, according to Test Examples, is represented in Table 1.

TABLE 1

| Formulation | | Test Example 1 Amount (g) of compounding | Test Example 2 Amount (g) of compounding | Test Example 3 Amount (g) of compounding | Comparative Example 1 Amount (g) of compounding | Comparative Example 2 Amount (g) of compounding |
|---|---|---|---|---|---|---|
| Dispersing step | Activated carbon (solid content) | 3.6 | 3.6 | 3.6 | 3.6 | 3.6 |
| | Manganese dioxide-based catalyst | 8 | 8 | 8 | 8 | 8 |
| | Dispersant | Polyacrylate-based | Polyacrylate-based | Polyacrylate-based | — | Polycarboxylic acid ammonium salt |
| | | 0.5 | 0.5 | 1 | — | 1 |
| | Water | 68.4 | 72.4 | 71.9 | 71.9 | 71.9 |
| Neutralization step | TEA | 1.5 | 1.5 | 1.5 | 1.5 | 1.5 |
| Coating material formation step | Acrylic resin | — | 8 | 8 | 8 | 8 |
| | Polypropylene resin | 12 | — | — | — | — |
| | Additive | 6 | 6 | 6 | 6 | 6 |
| Total | | 100 | 100 | 100 | 100 | 100 |
| Storage stability | | A | A | A | No Coating material formed C | No Coating material formed C |

TABLE 1-continued

| | | | | | |
|---|---|---|---|---|---|
| Ozone degradability | | A | A | A | No Coating material formed C | No Coating material formed C |
| Overall evaluation | | A | A | A | C | C |

| Formulation | | Comparative Example 3 Amount (g) of compounding | Comparative Example 4 Amount (g) of compounding | Comparative Example 5 Amount (g) of compounding | Comparative Example 6 Amount (g) of compounding |
|---|---|---|---|---|---|
| Dispersing step | Activated carbon (solid content) | 3.6 | 3.6 | 3.6 | 3.6 |
| | Manganese dioxide-based catalyst | 8 | 8 | 8 | 8 |
| | Dispersant | Polycarboxylic acid sodium salt | Phosphate | Polyurethane | Polycarboxylic acid sodium salt |
| | | 1 | 1 | 1 | 3 |
| | Water | 71.9 | 71.9 | 71.9 | 69.9 |
| Neutralization step | TEA | 1.5 | 1.5 | 1.5 | 1.5 |
| Coating material formation step | Acrylic resin | 8 | 8 | 8 | 8 |
| | Polypropylene resin | — | — | — | — |
| | Additive | 6 | 6 | 6 | 6 |
| Total | | 100 | 100 | 100 | 100 |
| Storage stability | | C | C | C | A |
| Ozone degradability | | B | B | B | C |
| Overall evaluation | | C | C | C | C |

As represented in Table 1, the aqueous coating material composition according to Test Example 1 included activated carbon (raw material; palm shell, average particle size; 5 μm, BET specific surface area; 2000 m²/g), a manganese dioxide-based catalyst (content of manganese dioxide; 70% or more, average particle size; 5 μm, BET specific surface area; 250 m²/g), a polyacrylate-based dispersant, water as a solvent, triethylamine (TEA) as a pH adjuster (neutralizing agent), an aqueous dispersion liquid including a polypropylene resin as a resin, and additives (viscosity modifier and thickening aid).

The aqueous coating material compositions according to Test Example 2 and Test Example 3 each corresponded to an example in which an aqueous dispersion liquid including an acrylic resin as a resin instead of the polypropylene resin in Test Example 1 was used. Other materials were the same as those in Test Example 1.

In Table 1, the value with respect to the activated carbon is represented in terms of solid content and the value with respect to water in the dispersing step corresponds to the amount of water including not only ion-exchange water added as a solvent, but also water as a solvent contained in advance in a commercially available product of an activated carbon material.

The aqueous coating material compositions according to Test Example 1 to Test Example 3 were each produced by first performing a dispersing step of mixing activated carbon, a manganese dioxide-based catalyst, water as a solvent, and a polyacrylate-based dispersant according to each compounding in Table 1, and placing the mixture in a bead mill and dispersing the mixture.

The bead mill here used was one with 1.5-mm zircon (zirconia bead mill) as a medium, and a mixture material was dispersed in conditions of a rotational speed of 1500 rpm and 90 minutes.

Thus, the size of the particles (activated carbon and manganese dioxide-based catalyst) in the mixture after dispersing, maximum particle size (Dmax), was 20 μm or less, as measured by a line transect method with a grind gauge according to JISK 5600 and JISK 5400 (1990), in Test Example 1 to Test Example 3. The 90% cumulative particle size (D90) on a volume basis was 10 μm or less, as measured by a laser analysis method with a laser diffraction particle size distribution measurement apparatus.

Subsequently, the resulting mixture was subjected to a neutralization step of performing neutralization by addition of triethylamine (TEA) as a pH adjuster, according to each compounding in Table 1.

Next, a coating material formation step was performed in which the mixture neutralized was mixed with a polypropylene resin (solid content 30% by mass) or an acrylic resin (solid content 40% by mass) as a resin, according to each compounding in Table 1, and then further mixed with additives (viscosity modifier and thickening aid) and stirred by a disper for from 5 minutes to 10 minutes, thereby mixing and dispersing such each material.

The aqueous coating material compositions according to Test Example 1 to Test Example 3 were obtained according to the above steps.

The aqueous coating material compositions according to Comparative Examples 1 to Comparative Example 6, for comparison, were each produced according to each formulation represented in Table 1, with any dispersant different from those in Test Examples or without any dispersant.

Comparative Example 1 was an example in which no dispersant was used.

Comparative Example 2 was an example in which a polycarboxylic acid ammonium salt (anion) was used as the dispersant instead of the polyacrylate-based dispersant used in Test Examples.

Comparative Example 3 and Comparative Example 6 were each an example in which a polycarboxylic acid sodium salt (anion) was used as the dispersant instead of the polyacrylate-based dispersant used in Test Examples.

Comparative Example 4 was an example in which phosphate was used as the dispersant instead of the polyacrylate-based dispersant used in Test Examples.

Comparative Example 5 was an example in which polyurethane was used as the dispersant instead of the polyacrylate-based dispersant used in Test Examples.

The aqueous coating material compositions according to Comparative Examples were each also produced according to the same procedure as in Test Examples described above.

Such various aqueous coating material compositions according to Test Examples and Comparative Examples, produced according to each compounding in Table 1, were subjected to evaluation tests of storage stability and ozone degradability thereof.

The storage stability was evaluated based on whether or not such each aqueous coating material composition produced was aggregated at one month after storage in a temperature condition of 20° C. for one month. Any case in which no aggregation occurred even after storage at 20° C. for one month was rated as A, and any case in which separation due to sedimentation occurred by aggregation was rated as C.

The ozone degradability was tested using an ozone degradation test apparatus 200 illustrated in FIG. 4. Specifically, a test piece T obtained by coating a polypropylene TP substrate 220 (hereinafter, referred to as "PP material 220".) with such each coating material composition and drying the resultant, for evaluation, was flatly placed in a pipe 210 of the ozone degradation test apparatus 200 illustrated in FIG. 4. The test piece T was a test piece obtained by coating a surface of the PP substrate 220 having a surface of 5 cm×7 cm with such each coating material composition at a coating area of 5 cm×7 cm, and drying the resultant at 100° C. for 10 minutes, thereby forming a cured coating film 220A on the PP material 220.

The PP material 220 was coated with the coating material composition until the basis material was covered over.

Air including ozone (initial concentration of ozone; 4.0 ppm (on a volume basis), temperature; 25° C.) was supplied to and allowed to flow through the pipe 210 into which the test piece T was placed, at an air speed of 1.0 m/s, and the concentration of ozone before passing through the PP material 220 provided with the cured coating film 220A, namely, the test piece T was measured by an ozone sensor 231. The concentration of ozone near the test piece T was measured by an ozone sensor 232.

The interval distance x between the ozone sensor 232 and the cured coating film 220A was here 2 mm. The evaluation test was performed at a room temperature (ordinary temperature) of about 25° C.

The rate of ozone degradation (={(b1−b2)/b1}×100)(%) with a cured coating film 1 was then calculated from the concentration b1 of ozone measured by the ozone sensor 231 and the concentration b2 of ozone measured by the ozone sensor 232. A case in which the rate of degradation and removal of ozone was 24% or more was rated as A, a case in which the rate was 18% or more but less than 24% was rated as B, and a case in which the rate was less than 18% was rated as C.

Overall evaluation was made, and a case in which both the storage stability and the ozone degradability were rated as A in such evaluation tests was designated as A, and other any case was designated as C. The results of such evaluation tests are as represented in the bottom row in Table 1.

As represented in the bottom row in Table 1, each of the aqueous coating material compositions according to Test Example 1 to Test Example 3, in which the polyacrylate-based dispersant was used as the dispersant, did not cause any aggregation even after storage at 20° C. for one month and was high in storage stability, because the manganese dioxide-based catalyst and the activated carbon were highly dispersed and were also high in dispersion stability.

The cured coating film formed from each of the aqueous coating material compositions according to Test Example 1 to Test Example 3 was less in clumping and roughness. The cured coating film had excellent formability which could allow the basis material to be sufficiently covered over at a dry thin thickness of about 5 μm, and was excellent also in ozone degradation performance.

On the contrary, Comparative Example 1 using no dispersant did not allow the activated carbon and the manganese dioxide-based catalyst to be dispersed, but caused aggregation and gelation and could not form any coating material.

Comparative Example 2 using a polycarboxylic acid ammonium salt as the dispersant also did not allow the activated carbon and the manganese dioxide-based catalyst to be dispersed, but caused aggregation and gelation, and could not form any coating material.

Comparative Example 3 to Comparative Example 5 using a polycarboxylic acid sodium salt (anion), phosphate, and polyurethane as the respective dispersants each could form a coating material, but were low in dispersibility and dispersion stability of the activated carbon and the manganese dioxide-based catalyst, and thus caused aggregation in storage at 20° C. for one month and were problematic in terms of storage stability. The dispersibilities of the manganese dioxide-based catalyst and the activated carbon were low, and there was not obtained any fine particle size unlike Test Examples each using the polyacrylate-based dispersant. Thus, clumping and roughness considerably occurred in the coating film after coating. The coating film obtained by coating so that the basis material could be sufficiently covered over was large in thickness, and was inferior in formability. The coating film was also inferior in ozone degradation performance as compared with those in Test Examples each using the polyacrylate-based dispersant.

Comparative Example 6 exhibited deteriorated ozone degradability, although could enhance storage stability by an increase in amount of a polycarboxylic acid sodium salt (anion) as the dispersant. The reason was considered because a large amount of the dispersant inhibited ozone from adsorbing to the activated carbon and the manganese dioxide-based catalyst. In other words, Comparative Example 6 could not obtain desired ozone degradability as compared with Test Examples because, while a small amount of the dispersant could not allow storage stability to be ensured, an increased amount of the dispersant inhibited ozone from adsorbing to the activated carbon and the manganese dioxide-based catalyst.

Thus, the dispersant used in each of Comparative Examples could not allow favorable storage stability and ozone degradability to be simultaneously satisfied.

On the contrary, the polyacrylate-based dispersant used in each of Test Example 1 to Test Example 3 could allow the activated carbon and the manganese dioxide-based catalyst to be finely dispersed by a small amount of the dispersant. Test Example 1 to Test Example 3 each also caused less re-aggregation and exhibited excellent dispersion degree and dispersion stability, and thus exhibited favorable storage stability, caused less clumping and roughness of the cured coating film, exhibited favorable film formability and appearance, and exhibited excellent ozone degradation performance.

In other words, the polyacrylate-based dispersant used in each of Test Examples could allow the activated carbon and the manganese dioxide-based catalyst to be finely dispersed even by a small amount of the dispersant, thereby resulting in an increase in amount of ozone which could adsorb to the activated carbon and the manganese dioxide-based catalyst. The activated carbon and the manganese dioxide-based catalyst could thus effectively exhibit their own ozone degradation performance, and were excellent in ozone degradation performance. Not only dispersion stability was high, but also storage stability was excellent. Accordingly, stable storage for a long period could be made and long-term preservability was high.

Comparative Example 3 to Comparative Example 5 each exhibited low dispersibilities of the activated carbon and the manganese dioxide-based catalyst and considerably caused aggregation, as described above. Thus, clumping and roughness considerably occurred in the cured coating film formed, and the coating film was low in formability and attachment ability to the substrate, and was not favorable in coating appearance.

On the contrary, Test Examples each could allow the activated carbon and the manganese dioxide-based catalyst to be finely dispersed by use of the polyacrylate-based

Test Examples 2-1 to 2-8

The inventors have particularly studied about an optimal amount of compounding of the polyacrylate-based dispersant, as represented in Table 2.

Various aqueous coating material compositions different in concentration of the polyacrylate-based dispersant were produced in which only the amount (g) of compounding of the polyacrylate-based dispersant, among formulations in Test Example 2 represented in Table 1, was varied and all compounding materials other than the polyacrylate-based dispersant were integrally the same as those in Test Example 2.

The same materials as in Table 1 were here used and each coating material composition was produced according to the same procedure.

Such aqueous coating material compositions in which the concentration of the polyacrylate-based dispersant was varied were subjected to the test evaluation of storage stability and the test evaluation of ozone degradability in the same manner as those in Table 1.

TABLE 2

|  | Test Example 2-1 | Test Example 2-2 | Test Example 2-3 | Test Example 2-4 | Test Example 2-5 | Test Example 2-6 | Test Example 2-7 | Test Example 2-8 |
| --- | --- | --- | --- | --- | --- | --- | --- | --- |
| Amount (g) of compounding of polyacrylate-based dispersant | 0.1 | 0.3 | 0.5 | 0.7 | 1.0 | 2.0 | 5.0 | 10.0 |
| Concentration (% by mass) of polyacrylate-based dispersant in aqueous coating material composition | 0.1 | 0.3 | 0.5 | 0.7 | 1.0 | 2.0 | 4.8 | 9.1 |
| Compounding ratio (parts by mass) of polyacrylate-based dispersant with respect to 100 parts by mass of total amount of activated carbon + manganese dioxide-based catalyst | 0.9 | 2.6 | 4.3 | 6.0 | 8.6 | 17.2 | 43.1 | 86.2 |
| Storage stability | C | A | A | A | A | A | A | A |
| Rate (%) of ozone degradation | 24.9 | 25.6 | 24.8 | 24.7 | 25.1 | 25.3 | 18.4 | 10.2 | dispersant, and thus the cured coating film formed was less in clumping and roughness and was also favorable in formability and appearance.

In Test Example 1 to Test Example 3 each using the polypropylene resin or the acrylic resin as the resin, the number of cells peeled was two or less in an attachment ability test to the metallic substrate, described below, and high attachment ability and adhesion ability to the metallic substrate could be obtained.

In particular, in Test Example 2 and Test Example 3 each using the polypropylene resin as the resin, the number of cells peeled was two or less in an attachment ability test to not only the metallic substrate, but also the resin substrate, described below, and high attachment ability and adhesion ability also to the resin substrate could be obtained.

Accordingly, in a case in which the polypropylene resin is used as the resin, the coating film can ensure high attachment ability to the metallic and resin substrates. The coating film requires for no special treatment facilities in attachment thereof, whereby a decrease in cost can be achieved.

In this regard, in a case in which the acrylic resin is used as the resin, adhesion ability and attachment ability to the metallic substrate are favorable, and the resin substrate is preferably pre-treated and then coated in order that high attachment ability is ensured in the coating film.

As represented in Table 2, Test Example 2-1 was an example in which the aqueous coating material composition contained the polyacrylate-based dispersant at a concentration of 0.1% by mass and thus the amount of compounding of the polyacrylate-based dispersant with respect to 100 parts by mass of the total amount (total amount in terms of solid content) of the manganese dioxide-based catalyst and the activated carbon was 0.9 parts by mass. The Example exhibited inferior dispersion stabilities of the activated carbon and the manganese dioxide-based catalyst as compared with Test Examples 2-2 to 2-7, and as a result, caused aggregation in storage at 20° C. for one month.

Test Example 2-8 was an example in which the aqueous coating material composition contained the polyacrylate-based dispersant at a concentration of 9.1% by mass and thus the amount of compounding of the polyacrylate-based dispersant with respect to 100 parts by mass of the total amount (total amount in terms of solid content) of the manganese dioxide-based catalyst and the activated carbon was 86.2 parts by mass. The Example exhibited a low rate of ozone degradation as compared with Test Examples 2-2 to 2-7.

The reason was considered because a large amount of the dispersant inhibited ozone from adsorbing to the activated carbon and the manganese dioxide-based catalyst.

On the contrary, Test Examples 2-2 to 2-7 were each an example in which the aqueous coating material composition contained the polyacrylate-based dispersant at a concentration of from 0.3 to 4.8% by mass and thus the amount of compounding of the polyacrylate-based dispersant with respect to 100 parts by mass of the total amount (total amount in terms of solid content) of the manganese dioxide-based catalyst and the activated carbon was in a range of from 2.6 parts by mass to 43.1 parts by mass. It was confirmed in the Examples that the polyacrylate-based dispersant was compounded in an appropriate amount and thus, in particular, not only the manganese dioxide-based catalyst and the activated carbon were highly dispersed and the dispersion stabilities thereof were also favorable, but also high storage stability and ozone degradability were simultaneously satisfied without any inhibition of adsorption of ozone.

The inventors have also confirmed that particularly storage stability can be ensured in a case in which the amount of compounding of the polyacrylate-based dispersant with respect to 100 parts by mass of the total amount (total amount in terms of solid content) of the manganese dioxide-based catalyst and the activated carbon is preferably 1.5 parts by mass or more, more preferably 2 parts by mass or more, still more preferably 2.5 parts by mass or more. The inventors have also confirmed that particularly high ozone degradability is obtained and the coating film is also favorable in formability, attachment ability, and appearance in a case in which the amount of compounding of the polyacrylate-based dispersant is preferably 75 parts by mass or less, more preferably 60 parts by mass or less, still more preferably 50 parts by mass or less.

The polyacrylate-based dispersant is accordingly preferably compounded in a range of from 1.5 parts by mass to 75 parts by mass with respect to 100 parts by mass of the total amount (total amount in terms of solid content) of the manganese dioxide-based catalyst and the activated carbon. The range can allow high storage stability and ozone degradability to be effectively satisfied simultaneously and also allows the coating film to be favorable in formability, attachment ability, and appearance. The amount of compounding of the polyacrylate-based dispersant with respect to 100 parts by mass of the total amount (total amount in terms of solid content) of the manganese dioxide-based catalyst and the activated carbon is more preferably in a range of from 2 parts by mass to 60 parts by mass, still more preferably from 2.5 parts by mass to 50 parts by mass.

The concentration of the polyacrylate-based dispersant in the aqueous coating material composition is preferably in a range of from 0.3 to 5% by mass. The range can allow high storage stability and ozone degradability to be effectively satisfied simultaneously and also allows the coating film to be favorable in formability, attachment ability, and appearance. The concentration of the polyacrylate-based dispersant in the aqueous coating material composition is more preferably from 0.3 to 2% by mass.

Test Examples 4 to 8 and Comparative Examples 7 to 8

The inventors have particularly studied about any optimal compounding of the manganese dioxide-based catalyst and the activated carbon, as represented in Table 3 and Table 4 below.

The effect of the compounding ratio (ratio) of the activated carbon and the manganese dioxide-based catalyst each having ozone degradation ability on performances of the aqueous coating material composition and the coating film formed therefrom was first examined. Specifically, the compounding ratio (ratio) of the activated carbon and the manganese dioxide was varied as represented in Table 3 below, whereby various coating material compositions were produced. The same materials as in Table 1 were also here used and each coating material composition was produced according to the same procedure. Such each coating material composition produced was also subjected to tests of storage stability and ozone degradability thereof.

The storage stability test of such each aqueous coating material composition was performed by evaluation in which whether or not aggregation occurred after storage in a temperature condition of 20° C. for one month, as in Table 1 above. Any case was rated as B, in which separation due to sedimentation by aggregation was slightly observed after storage at 20° C. for one month, but coatability was not problematic by stirring in coating.

The ozone degradability test was performed as follows. A test piece T obtained by coating a polypropylene TP substrate 220 (PP material 220) with such each aqueous coating material composition and drying the resultant, for evaluation, was placed in a 20-L mylar bag 250 as illustrated in FIG. 5. The test piece T was a test piece obtained by coating a surface of the PP substrate 220 having a surface of 5 cm×7 cm with such each coating material composition at a coating area of 5 cm×7 cm, and drying the resultant at 100° C. for 10 minutes, thereby forming a test piece in which a cured coating film 220A was formed on the PP material 220.

Next, ozone generated in an ozone generator after encapsulation of air by air blow into a mylar bag 250 was injected, the concentration of ozone in the bag 50 was adjusted to 0.2 ppm (on a volume basis), and the mylar bag 250 was closed by heat sealing. The concentration of ozone in the mylar bag 250 was measured by an ozone sensor 233 after a lapse of 30 minutes, whereby the rate of ozone degradation relative to the initial concentration of ozone was calculated.

The evaluation test here was performed at a room temperature (ordinary temperature) of 25° C. The PP material 220 was coated with any of various coating material compositions so that the basis material was covered over.

Those in Comparative Example 7 and Comparative Example 8, produced for comparison, each included only any one of the activated carbon or the manganese dioxide-based catalyst. The evaluation tests of the storage stability and ozone degradation performance were performed in the same manner also in the Examples.

The formulation of each of such various coating material compositions is represented in upper rows in Table 3, and the results of the evaluation test are represented in lower rows in Table 3. Also in Table 3, the value with respect to the activated carbon is also represented in terms of solid content and the value with respect to water in the dispersing step corresponds to the amount of water including not only ion-exchange water added as a solvent, but also water as a solvent contained in advance in a commercially available product of an activated carbon material.

TABLE 3

| Formulation | | Test Example 4 Amount (g) of compounding | Test Example 5 Amount (g) of compounding | Test Example 6 Amount (g) of compounding | Test Example 7 Amount (g) of compounding | Test Example 8 Amount (g) of compounding | Comparative Example 7 Amount (g) of compounding | Comparative Example 8 Amount (g) of compounding |
|---|---|---|---|---|---|---|---|---|
| Activated carbon/manganese dioxide-based catalyst (ratio) | | 20/80 | 30/70 | 50/50 | 70/30 | 80/20 | 0/100 | 100/0 |
| Dispersing step | Activated carbon (solid content) | 2.3 | 3.5 | 5.8 | 8.1 | 9.3 | 0 | 11.6 |
| | Manganese dioxide-based catalyst | 9.3 | 8.1 | 5.8 | 3.5 | 2.3 | 11.6 | 0 |
| | Polyacrylate-based dispersant | 0.5 | 0.5 | 0.5 | 0.5 | 0.5 | 0.5 | 0.5 |
| | Water | 68.4 | 68.4 | 68.4 | 68.4 | 68.4 | 68.4 | 68.4 |
| Neutralization step | TEA | 1.5 | 1.5 | 1.5 | 1.5 | 1.5 | 1.5 | 1.5 |
| Coating material formation step | Polypropylene resin | 12 | 12 | 12 | 12 | 12 | 12 | 12 |
| | Additive | 6 | 6 | 6 | 6 | 6 | 6 | 6 |
| Total | | 100 | 100 | 100 | 100 | 100 | 100 | 100 |
| Storage stability | | A | A | A | A | B | A | C |
| Rate (%) of ozone degradation | | 80.0 | 83.0 | 83.1 | 81.9 | 76.0 | 75.9 | 50.0 |

As represented in Table 3, Comparative Example 7 in which no activated carbon was compounded and only the manganese dioxide-based catalyst was compounded exhibited a low rate of ozone degradation of 75.9%, and exhibited a lower rate of ozone degradation than those in Test Examples.

Comparative Example 8 in which no manganese dioxide-based catalyst was compounded and only the activated carbon was compounded exhibited a rate of ozone degradation of 50%, and such a rate was significantly inferior as compared with Test Examples. The storage stability was also extremely low.

The reason was because the activated carbon caused a resin component (namely, organic substance) as a coating film component to adsorb thereto due to adsorption characteristics and thus aggregation occurred. It was found that no coating material stability, namely, no storage stability could be confirmed in compounding of only the activated carbon.

On the contrary, Test Examples using the manganese dioxide-based catalyst and the activated carbon in combination exhibited an enhanced rate of ozone degradation and extremely high ozone degradation performance as compared with Comparative Example 7 and Comparative Example 8 in which only the manganese dioxide-based catalyst or only the activated carbon was singly used.

In a case in which the amount of the activated carbon, among the manganese dioxide-based catalyst and the activated carbon required for ensuring predetermined high ozone degradation performance, is increased, stability (namely, storage stability) of a coating material may be difficult to ensure. The activated carbon is oxidized, consumed, or deteriorated due to use for a long period, and thus high durability may be difficult to ensure.

In a case in which the compounding ratio of the activated carbon is small, no effect of the activated carbon on ozone removal characteristics may be exerted, the effect of enhancement in ozone degradation ability due to a combination of the activated carbon and the manganese dioxide-based catalyst may be small, and high ozone degradation performance may be difficult to obtain.

In particular, the manganese dioxide-based catalyst is easily affected by moisture and/or chloride and $SO_x$ and/or $MO_x$ in the atmosphere and is thus easily deteriorated in ozone degradability, and therefore is preferably compounded at a predetermined ratio with respect to the activated carbon in order to ensure high ozone degradability for a long period.

According to intensive experimental studies by the inventors, the ratio of the activated carbon and the manganese dioxide-based catalyst in the aqueous coating material composition preferably satisfies 20/80≤activated carbon/manganese dioxide-based catalyst≤80/20 in Test Example 4 to Test Example 8, as represented in Table 3, whereby a favorable rate of ozone degradation can be obtained and practical storage stability can be easily ensured.

In particular, in a case in which the ratio (mass ratio in terms of solid content) of the activated carbon and the manganese dioxide-based catalyst more preferably satisfies 30/70≤activated carbon/manganese dioxide-based catalyst≤70/30 as indicated in Test Example 5 to Test Example 7, an excellent rate of ozone degradation and excellent storage stability are obtained and extremely high ozone degradability and coating material stability can be easily ensured for a long period.

The ratio (mass ratio in terms of solid content) of the activated carbon and the manganese dioxide-based catalyst in the aqueous coating material composition corresponds to the ratio of the activated carbon and the manganese dioxide-based catalyst in a coating film component formed from the aqueous coating material composition. In other words, in a case in which the ratio of the activated carbon and the manganese dioxide-based catalyst in the aqueous coating material composition satisfies 20/80≤activated carbon/manganese dioxide-based catalyst≤80/20, the activated carbon and the manganese dioxide-based catalyst are also included in a cured coating film obtained from the aqueous coating material composition, at a ratio of 20/80≤activated carbon/manganese dioxide-based catalyst≤80/20.

Test Examples 7-1 to 7-5

The inventors have further performed the following test in order to examine the amounts of compounding of the activated carbon and the manganese dioxide-based catalyst each having ozone degradation performance, and the effect on coating film performance. The test was performed in which, while the compounding ratio (mass ratio in terms of solid content) of the activated carbon and the manganese dioxide-based catalyst in the aqueous coating material composition (in the coating film component) was constant at a ratio of activated carbon/manganese dioxide-based catalyst=70/30, among formulations in Test Example 7 represented in Table 3, the amounts of compounding of the activated carbon and the manganese dioxide-based catalyst were increased or decreased. Specifically, various coating material compositions were produced by compounding of the activated carbon and the manganese dioxide-based catalyst so that the concentration of the activated carbon and the manganese dioxide-based catalyst in the coating film formed from the aqueous coating material composition was from 33% by mass to 83% by mass, as represented in Table 4.

All the formulation and materials other than the activated carbon and the manganese dioxide-based catalyst were integrally the same as those in Test Example 7, and each coating material composition was produced according to the same procedure as described above. In other words, all the amounts (g) of compounding of materials other than the activated carbon and the manganese dioxide-based catalyst were integrally the same as those in Test Example 7, only the amounts (g) of compounding of the activated carbon and the manganese dioxide-based catalyst were varied, and each coating material composition was produced according to the same procedure as described above.

Each coating material composition produced was subjected to the tests of ozone degradability and attachment ability to the substrate.

The ozone degradability test was performed with the ozone degradation test apparatus illustrated in FIG. 4, as in Test Example 1.

The attachment ability test was made with a specimen obtained by subjecting a PP substrate to air spray coating with the aqueous coating material composition and drying the resultant at 100° C. for 10 minutes to thereby form a cured coating film on the PP substrate.

The specimen was subjected to evaluation of attachment ability (attachment ability according to a cross cut method) according to JIS-K5600-5-6:1999. Specifically, eleven parallel cuts were made horizontally and vertically on the cured coating film of the specimen at an interval of 1 mm by use of a cutter, and 100 cells in total of 1 mm×1 mm were formed thereon. Next, a pressure-sensitive adhesive tape (namely, masking tape) was strongly pushed and pasted onto a section in which such 100 cells were formed, and was peeled at one time, and the number of cells peeled, among such 100 cells, was measured. A case in which the number of cells peeled was two or less was rated as A, and a case in which three or more cells peeled were observed was rated as B.

The concentration of the activated carbon and the manganese dioxide-based catalyst in any of various coating material compositions produced is represented in an upper row in Table 4, and the evaluation test results are represented in lower rows in Table 4.

TABLE 4

|  | Test Example 7-1 | Test Example 7-2 | Test Example 7-3 | Test Example 7-4 | Test Example 7-5 |
|---|---|---|---|---|---|
| Concentration (% by mass) of activated carbon + manganese dioxide-based catalyst in coating film | 33% | 53% | 63% | 73% | 83% |
| Activated carbon/manganese dioxide-based catalyst (ratio) |  |  | 70/30 |  |  |
| Rate (%) of ozone degradation | 1.23 | 8.50 | 19.61 | 25.25 | 25.61 |
| Attachment ability | A | A | A | A | B |

As represented in Table 4, it was found that, as the concentration of the activated carbon and the manganese dioxide-based catalyst was higher, ozone degradation performance was higher.

In particular, high ozone degradability could be obtained at a concentration of the activated carbon and the manganese dioxide-based catalyst in the coating film formed from the aqueous coating material composition, of 63% or more, as indicated in Test Examples 7-3 to 7-5.

Even in a case in which the concentration of the catalysts was increased, dispersibility is limited in a predetermined amount of the dispersant at a concentration of the catalysts in the coating film component, of 73% or more, as indicated in Test Examples 7-4 to 7-5, and thus an increase in ozone degradation ability was presumed to be small.

In a case in which the concentration of the activated carbon and the manganese dioxide-based catalyst was too high, attachment performance was deteriorated, as indicated in Test Example 7-5. Such low attachment performance to the substrate caused peeling of the coating film and dripping of the coating film component to easily occur, and high ozone degradation performance could not be probably continuously obtained.

It has been confirmed according to experimental studies by the inventors that, in a case in which the ratio (mass ratio in terms of solid content) of the activated carbon and the manganese dioxide-based catalyst in the aqueous coating material composition (namely, in the coating film) satisfies 20/80≤activated carbon/manganese dioxide-based catalyst≤80/20, particularly high ozone degradation performance can be obtained in a total amount (total amount in terms of solid content) of the activated carbon and the manganese dioxide-based catalyst in the coating film component, of preferably 60% by mass or more, more preferably 70% by mass or more. It has also been confirmed that, in particular, the coating film is also favorable in attachment performance to the substrate in a total amount (total amount in terms of solid content) of the activated carbon and the manganese dioxide-based catalyst in the coating film of, in particular, preferably 90% by mass or less, more preferably 85% by mass or less.

The total amount (total amount in terms of solid content) of the activated carbon and the manganese dioxide-based catalyst in the coating film is thus preferably 60% by mass to 90% by mass, more preferably 70% by mass to 80% by mass. Thus, in particular, attachment ability to the substrate can be ensured and high ozone degradation performance for a long time can be maintained.

The total amount (% by mass) of the activated carbon and such manganese dioxide in the coating film formed from the aqueous coating material composition is calculated according to the ratio, Total amount of solid content of activated carbon and manganese dioxide/Amount of entire solid content in aqueous coating material composition to be formed into coating film component X 100.

The manganese dioxide-based catalyst and the activated carbon can be finely and highly dispersed by the polyacrylate-based dispersant, and thus clumping hardly occurs in a cured coating film and a coating film high in formability and attachment ability can be formed, according to Test Examples, as described above. The manganese dioxide-based catalyst and the activated carbon highly dispersed can be attached to a large amount of ozone, and thus high ozone degradation performance can be exerted. In particular, the manganese dioxide-based catalyst, which is high in catalytic activity for ozone degradation, is used as the manganese oxide-based catalyst, whereby high ozone degradation ability is obtained. The manganese dioxide-based catalyst and the activated carbon are used in combination, whereby high ozone degradation performance is obtained as compared with a case in which such a catalyst is used singly. Such activated carbon is inexpensively available, thereby resulting in suppression of cost. The polyacrylate-based dispersant allows dispersion stabilities of the manganese dioxide-based catalyst and the activated carbon to be high, and thus practically favorable coating material stability and storage stability are obtained.

The manganese dioxide-based catalyst here used is preferably a manganese dioxide-based catalyst having a median size (average particle size) in a range of from 1 to 20 μm and a BET specific surface area in a range of from 100 to 400 m²/g. Any manganese dioxide-based catalyst having such characteristics, in particular, allows the coating material composition to be high in dispersibility and dispersion stability, and allows a coating film high in ozone degradability to be obtained.

The activated carbon here used is preferably any activated carbon having a median size (average particle size) in a range of from 1 to 20 μm and a BET specific surface area in a range of from 500 to 3000 m²/g. Any activated carbon having such characteristics, in particular, allows the coating material composition to be high in dispersibility and dispersion stability, and allows a coating film high in ozone degradability to be obtained.

The polyacrylate-based dispersant is preferably any dispersant having a weight average molecular weight in a range of from 500 to 30000, an acid value in a range of from 1 to 50, and a pH in a range of from 5 to 9. Any polyacrylate-based dispersant having such characteristics, in particular, can provide the effect of highly dispersing and stably dispersing each coating material component even by a small amount of the dispersant, without any loss of ozone degradation performance.

The content of the polyacrylate-based dispersant is preferably in a range of from 1.5 parts by mass to 70 parts by mass with respect to 100 parts by mass of the total amount of the manganese dioxide-based catalyst and the activated carbon. Thus, in particular, high ozone degradability and storage stability can be simultaneously satisfied. The aqueous coating material composition, which contains the polyacrylate-based dispersant in a range of from 0.3% by mass to 5% by mass, can allow high ozone degradability and storage stability to be simultaneously satisfied.

The resin is preferably a (meth)acrylic resin or a polypropylene resin. Such a resin is good in compatibility with the manganese dioxide-based catalyst and the activated carbon, and the manganese dioxide-based catalyst and the activated carbon are easily uniformly dispersed in such a resin. In particular, a (meth)acrylic resin is widely selected in terms of the molecular weight thereof, whereby performance characteristics of an objective coating film are easily designed and furthermore a coating film high in weather resistance, water resistance, and chemical resistance can be formed. A polypropylene resin is excellent in attachment ability to not only a metallic substrate, but also a resin substrate, and performance characteristics of a coating film, such as ozone degradation performance, can be favorably exhibited for a long period.

The manganese dioxide-based catalyst and the activated carbon are preferably compounded at a mass ratio of 20/80≤activated carbon/manganese dioxide-based catalyst 80/20 (mass ratio in terms of solid content). Thus, in particular, while coating material stability is ensured, the synergistic effect of ozone degradability due to a combination of the manganese dioxide-based catalyst and the activated carbon is obtained.

The manganese oxide-based catalyst and the activated carbon are preferably compounded so that the total amount of the manganese oxide-based catalyst and the activated carbon in the coating film is in a range of from 60% by mass to 90% by mass. Thus, in particular, high ozone degradation performance can be obtained without any loss of attachment ability of the coating film to the substrate.

It has been found as described above that an ozone-degradable coating film including a manganese oxide-based catalyst, activated carbon, a polyacrylate-based dispersant, and a resin has high ozone degradation performance.

It can be thus seen that a blower including the ozone-degradable coating film can blow air decreased in concentration of ozone.

What is claimed is:

1. An ozone-degradable coating film-bearing article comprising:
   an article body; and
   an ozone-degradable coating film that is provided on the article body and that comprises a manganese oxide-based catalyst, activated carbon, a polyacrylate-based dispersant, and a resin,
   wherein the manganese oxide-based catalyst is a manganese dioxide-based catalyst,
   wherein a compounding ratio of the activated carbon to the manganese oxide-based catalyst satisfies 20/80≤activated carbon/manganese oxide-based catalyst≤80/20, in terms of a mass ratio, and
   wherein a content of the polyacrylate-based dispersant is in a range of from 1.5 parts by mass to 75 parts by mass with respect to 100 parts by mass of a total amount of the manganese oxide-based catalyst and the activated carbon.

2. The ozone-degradable coating film-bearing article according to claim 1, wherein the article body is a honeycomb structural member, a filter member, a duct, or a building material.

3. The ozone-degradable coating film-bearing article according to claim 1, wherein the compounding ratio of the activated carbon to the manganese oxide-based catalyst satisfies 50/50≤activated carbon/manganese oxide-based catalyst≤80/20, in terms of the mass ratio, and
   wherein the content of the polyacrylate-based dispersant is in a range of from 2.6 parts by mass to 43.1 parts by mass with respect to 100 parts by mass of a total amount of the manganese oxide-based catalyst and the activated carbon.

4. The ozone-degradable coating film-bearing article according to claim 1, wherein the polyacrylate-based dispersant is a dispersant having a weight average molecular weight in a range of from 5000 to 30000, an acid value in a range of from 1 to 50, and a hydrogen-ion exponent in a range of from pH 4 to pH 9.

5. An air-conditioning system comprising an ozone-degradable coating film-bearing article comprising:
   an article body; and
   an ozone-degradable coating film that is provided on the article body and that comprises a manganese oxide-based catalyst, activated carbon, a polyacrylate-based dispersant, and a resin,
   wherein the manganese oxide-based catalyst is a manganese dioxide-based catalyst,
   wherein a compounding ratio of the activated carbon to the manganese oxide-based catalyst satisfies 20/80≤activated carbon/manganese oxide-based catalyst≤80/20, in terms of a mass ratio, and
   wherein a content of the polyacrylate-based dispersant is in a range of from 1.5 parts by mass to 75 parts by mass with respect to 100 parts by mass of a total amount of the manganese oxide-based catalyst and the activated carbon.

6. The air-conditioning system according to claim 5, wherein the compounding ratio of the activated carbon to the manganese oxide-based catalyst satisfies 50/50≤activated carbon/manganese oxide-based catalyst≤80/20, in terms of the mass ratio, and
   wherein the content of the polyacrylate-based dispersant is in a range of from 2.6 parts by mass to 43.1 parts by mass with respect to 100 parts by mass of a total amount of the manganese oxide-based catalyst and the activated carbon.

7. The air-conditioning system according to claim 5, wherein the polyacrylate-based dispersant is a dispersant having a weight average molecular weight in a range of from 5000 to 30000, an acid value in a range of from 1 to 50, and a hydrogen-ion exponent in a range of from pH 4 to pH 9.

* * * * *